US012651553B2

(12) United States Patent
Kim et al.

(10) Patent No.: US 12,651,553 B2
(45) Date of Patent: Jun. 9, 2026

(54) DISPLAY DEVICE COMPRISING TRANSFORMER COMPRISING CORE HAVING STRUCTURE RELATED WITH COUPLING FACTOR OF INDUCTOR

(71) Applicant: SAMSUNG ELECTRONICS CO., LTD., Suwon-si (KR)

(72) Inventors: Moonyoung Kim, Suwon-si (KR); Keonwoo Kim, Suwon-si (KR); Jeongil Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 769 days.

(21) Appl. No.: 17/861,342

(22) Filed: Jul. 11, 2022

(65) Prior Publication Data

US 2023/0065839 A1     Mar. 2, 2023

Related U.S. Application Data

(63) Continuation of application No. PCT/KR2022/008117, filed on Jun. 9, 2022.

(30) Foreign Application Priority Data

Sep. 2, 2021     (KR) ........................ 10-2021-0116821

(51) Int. Cl.
| G09G 3/32 | (2016.01) |
| G09G 5/10 | (2006.01) |
(Continued)

(52) U.S. Cl.
CPC ................. *G09G 3/32* (2013.01); *G09G 5/10* (2013.01); *H01F 3/10* (2013.01); *H01F 27/24* (2013.01);
(Continued)

(58) Field of Classification Search
CPC ........ H01F 27/24; H01F 27/30; H01F 27/303; H01F 27/306; H01F 27/325; H01F 38/08;
(Continued)

(56) References Cited

U.S. PATENT DOCUMENTS

| 2,694,177 A | 11/1954 | Sola |
| 3,072,826 A | 1/1963 | Schwarz et al. |
(Continued)

FOREIGN PATENT DOCUMENTS

| CN | 109524219 | 3/2019 |
| CN | 111223635 | 6/2020 |
(Continued)

OTHER PUBLICATIONS

Extended European Search Report dated Oct. 11, 2024 issued in European Patent Application No. 22864830.9.
(Continued)

*Primary Examiner* — Jason M Mandeville
(74) *Attorney, Agent, or Firm* — Nixon & Vanderhye P.C.

(57) ABSTRACT

A display device includes: a transformer including a core including a first surface and a protrusion protruding from the first surface along a direction which the first surface faces, wherein a cross-section of a first portion of the protrusion perpendicular to the direction which the first surface faces has a first area and a cross-section of a second portion of the protrusion between the first portion and the first surface has a second area that is larger than the first area; a first inductor sub-assembly including a first bobbin having a first opening corresponding to the first area, to be in contact with an outer circumference of a first portion of the core, and an inductor wound around the first bobbin; and a second inductor sub-assembly including a second bobbin having a second opening corresponding to the second area, to be in contact
(Continued)

with an outer circumference of a second portion of the core, and an inductor wound around in the second bobbin.

18 Claims, 22 Drawing Sheets

(51) Int. Cl.

| | |
|---|---|
| *H01F 3/10* | (2006.01) |
| *H01F 27/24* | (2006.01) |
| *H01F 27/30* | (2006.01) |
| *H01F 27/32* | (2006.01) |
| *H01F 30/04* | (2006.01) |
| *H01F 38/08* | (2006.01) |
| *H01F 38/30* | (2006.01) |
| *H02M 1/00* | (2006.01) |
| *H02M 1/42* | (2007.01) |
| *H02M 3/00* | (2006.01) |
| *H02M 7/00* | (2006.01) |
| *H02M 7/04* | (2006.01) |
| *H04N 5/63* | (2006.01) |

(52) U.S. Cl.
CPC ......... *H01F 27/303* (2013.01); *H01F 27/306* (2013.01); *H01F 27/325* (2013.01); *H01F 30/04* (2013.01); *H01F 38/08* (2013.01); *H01F 38/30* (2013.01); *H02M 1/007* (2021.05); *H02M 1/42* (2013.01); *H02M 3/01* (2021.05); *H02M 7/003* (2013.01); *H02M 7/04* (2013.01); *H04N 5/63* (2013.01); *G09G 2330/02* (2013.01)

(58) Field of Classification Search
CPC ............ H01F 38/30; H01F 3/10; H01F 30/04; G09G 3/32; G09G 2330/00; G09G 2330/02; G09G 5/10; H02M 7/003; H02M 7/007; H02M 7/04; H02M 1/42; H02M 3/01; H04N 5/63
USPC ......................................................... 345/204
See application file for complete search history.

(56) References Cited

U.S. PATENT DOCUMENTS

| | | | | |
|---|---|---|---|---|
| 7,446,640 | B2 * | 11/2008 | Saito | H01F 27/326 |
| | | | | 336/212 |
| 8,692,638 | B2 | 4/2014 | Lee et al. | |
| 10,529,483 | B2 | 1/2020 | Yang | |
| 11,217,385 | B2 * | 1/2022 | Kawaguchi | H01F 27/325 |
| 11,380,473 | B2 * | 7/2022 | Ebner | H01F 5/02 |
| 2007/0257760 | A1 * | 11/2007 | Saito | H01F 38/10 |
| | | | | 336/178 |
| 2009/0021179 | A1 * | 1/2009 | Kim | H05B 41/282 |
| | | | | 315/276 |
| 2012/0262895 | A1 * | 10/2012 | Quek | H05K 3/30 |
| | | | | 29/606 |
| 2014/0125442 | A1 | 5/2014 | Cheon et al. | |
| 2015/0302969 | A1 * | 10/2015 | Aaron | H01F 27/245 |
| | | | | 716/112 |
| 2019/0139690 | A1 * | 5/2019 | Cheng | H01F 27/2823 |
| 2021/0012943 | A1 * | 1/2021 | Ebner | H01F 5/02 |
| 2021/0287849 | A1 * | 9/2021 | Kawaguchi | H02M 3/33569 |

FOREIGN PATENT DOCUMENTS

| | | |
|---|---|---|
| EP | 1793396 | 1/2013 |
| KR | 10-2006-0099756 | 9/2006 |
| KR | 10-1105572 | 1/2012 |
| KR | 10-1153515 B1 | 5/2012 |
| KR | 10-2012-0070925 | 7/2012 |
| KR | 10-2013-0002884 | 1/2013 |
| KR | 10-2013-0008655 | 1/2013 |
| KR | 10-2014-0113249 | 9/2014 |

OTHER PUBLICATIONS

Search Report and Written Opinion dated Sep. 20, 2022 issued in International Patent Application No. PCT/KR2022/008117.
Korean Office Action dated Nov. 28, 2025 issued in Korean Patent Application No. 10-2021-0116821 and English translation, 14 pp.

* cited by examiner

DISPLAY DEVICE COMPRISING TRANSFORMER COMPRISING CORE HAVING STRUCTURE RELATED WITH COUPLING FACTOR OF INDUCTOR

CROSS-REFERENCE TO RELATED APPLICATIONS

This application is a continuation of International Application No. PCT/KR2022/008117 designating the United States, filed on Jun. 9, 2022, in the Korean Intellectual Property Receiving Office and claiming priority to Korean Patent Application No. 10-2021-01168521, filed on Sep. 2, 2021, in the Korean Intellectual Property Office, the disclosures of which are incorporated by reference herein in their entireties.

BACKGROUND

Field

The disclosure relates to a display device including a transformer including a core having a structure related to a coupling factor of an inductor.

Description of Related Art

Along with the recent development of the electronic technology, various types of display devices have been developed and distributed. Further, with the development of these display devices, various circuits for supporting different functions may be incorporated in a display device. For simultaneous driving of multiple circuits incorporated in the display device, a power supply circuit of the display device may generate power signals of different voltages.

A display device may include a transformer used to generate power signals for simultaneously driving a plurality of circuits installed in the display device, which may often require a scheme for utilizing inductive coupling between inductors included in the transformer.

The technical problems to be achieved in this document are not limited to the above-described technical problem, and those having ordinary knowledge in the art to which the present disclosure belongs will clearly understand any other technical problems not mentioned herein from the following description.

SUMMARY

According to an example embodiment, provided is a display device comprising a transformer comprising a core including a first surface and a protrusion protruding from the first surface along a direction which the first surface faces. In the core, a cross-section of a first portion of the protrusion perpendicular to the direction has a first area, and a cross-section of a second portion of the protrusion between the first portion and the first surface has a second area larger than the first area. The transformer of the display device comprise a first inductor sub-assembly including a first bobbin including a first opening corresponding to the first area, and in contact with an outer circumference of a first portion of the core, and an inductor wound around the first bobbin. The transformer of the display device comprise a second inductor sub-assembly including a second bobbin including a second opening corresponding to the second area, and in contact with an outer circumference of a second portion of the core, and an inductor wound around in the second bobbin.

According to an example embodiment, provided is a display device comprising a transformer comprising a first core including a first surface and a protrusion protruding from the first surface along a direction which the first surface faces, wherein a cross-section of the protrusion perpendicular to the direction has a first area. The transformer of the display device comprises a first inductor sub-assembly including a first bobbin including a first opening corresponding to the first area and in contact with an outer circumference of the protrusion of the first core, and an inductor wound around the first bobbin; a second core including a second surface facing away from a first surface of the first core, and a protrusion protruding from the second surface along a direction which the second surface faces, wherein a cross-section of the protrusion perpendicular to the direction which the second surface faces has a second area different from the first area. The transformer of the display device comprises and a second inductor sub-assembly including a second bobbin having a second opening corresponding to the second area, and in contact with an outer circumference of the protrusion of the second core, and an inductor wound around the second bobbin.

Accordingly, a display device according to an example embodiment can increase the leakage inductance caused by the inductive coupling between inductors included in the transformer, to a level necessary for driving a circuitry connected to the transformer.

Further, the effects or advantages that can be obtained from the present disclosure are not limited to the foregoing ones, and any other effects not mentioned herein will be clearly understood by those having ordinary knowledge in the art to which the present disclosure belongs, from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
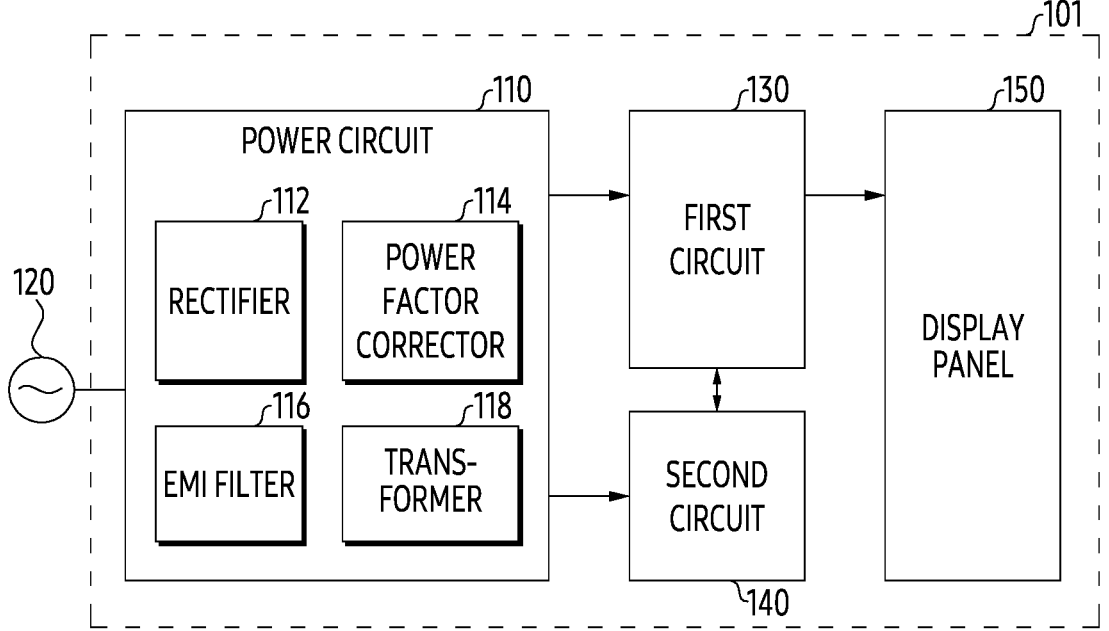
FIG. 1 is a block diagram illustrating an example configuration of a display device according to an exemplary embodiment.

Hereinafter, various example embodiments of the present disclosure will be described in greater detail with reference to the accompanying drawings.

Various embodiments of the disclosure and the terms used therein are not intended to limit the technology described in this document to a specific embodiment, and should be understood to include various modifications, equivalents, and/or substitutions of those embodiments. In connection with the description of the drawings, like reference numerals may be used for like components. The singular expression may include the plural expression, unless the context clearly dictates otherwise. Throughout this document, expressions such as "A or B", "at least one of A and/or B", "A, B or C" or "at least one of A, B and/or C" may include all the possible combinations of the items listed together. Expressions such as "first", "second" or the like may modify the corresponding elements regardless of their order or importance, and are used only to distinguish one element from another element and not intended to limit the corresponding elements thereto. When a certain (e.g., a first) element is referred to as being "(functionally or communicatively) connected" or "coupled" to another (e.g., a second) element, the element (e.g., the first) may be either directly connected to the other element (e.g., the second) or may be connected through another element (e.g., a third component).

As used herein, the term "module" may include a unit including hardware, software, or firmware, and may be used interchangeably with terms such as, for example, logic, logic block, component, or circuit. A module may be of an integrally formed component or a minimum unit or a part thereof performing one or more functions. For example, the module may be configured as an application-specific integrated circuit (ASIC).

FIG. 1 is a block diagram illustrating an example configuration of a display device 101 according to an exemplary embodiment. The display device 101 may be an electronic device capable of displaying an image. For example, the display device 101 may include a television (TV), a computer, a smartphone, a tablet, a portable media player, a wearable device, a video wall, an electronic picture frame, and the like. For example, the display device 101 may be implemented as various types of electronic devices, such as an image processing device including a set-top box without a display, home appliances including a refrigerator, a washing machine, etc., and an information processing device including a computer or the like. Hereinafter, for convenience of description, although it is assumed that the display device 101 is implemented as a TV, the embodiments disclosed are not limited thereto.

Referring now to FIG. 1, the display device 101 according to an example embodiment may include at least one of a power circuit 110, a first circuit 130, a second circuit 140, and a display panel 150. The power circuit 110, the first circuit 130, the second circuit 140, and the display panel 150 may be, for example, electrically and/or operably coupled with each other by an electronic component such as a power line and/or a communication bus. The types and/or number of hardware components included in the display device 101 are not limited to those illustrated in FIG. 1. For example, the display device 101 may only include some of the hardware components illustrated in FIG. 1.

Referring to FIG. 1, the power circuit 110 of the display device 101 according to an example embodiment may be electrically connected to a power source 120 supplied from a power distribution system. The display device 101 may include a power plug electrically connecting the power circuit 110 and the power source 120. With the power plug, the power circuit 110 of the display device 101 may receive an alternate current signal (AC signal) from the power source 120. The AC signal received by the power circuit 110 is a power signal having a voltage that changes over time, and for example, the voltage in the AC signal may change over a sinusoidal wave of a specified frequency (e.g., 60 Hz) and a specified amplitude (e.g., 220V and/or 110V).

The power circuit 110 of the display device 101 according to an example embodiment may use the AC signal received from the power source 120 to generate a direct current signal (DC signal) of a constant voltage, and/or another AC signal having a certain cycle and/or amplitude distinct from the AC signal. The DC signal may correspond to a power signal of a voltage maintained independently of a change in time. The power circuit 110 according to an example embodiment may simultaneously output a plurality of power signals with different voltages. Multiple outputs of the power circuit 110 may imply that the power circuit 110 outputs a plurality of power signals having different voltages. Such different voltages of the power signals output from the power circuit 110 may respectively correspond to voltages designated for driving each of different circuits (e.g., the first circuit 130 and the second circuit 140) included in the display device 101. In order to drive each of the different circuits included in the display device 101, the power circuit 110 may generate power signals having voltages corresponding to each of those circuits.

The display device 101 according to an example embodiment may include the first circuit 130 for driving the display panel 150. The display device 101 according to an example embodiment may include the display panel 150 that is controlled by the first circuit 130 to output an image. Using the display panel 150, the display device 101 may output visualized information to the user. The display panel 150 may include, for example, a flat panel display (FPD). The FPD may include, for example, a liquid crystal display (LCD), a plasma display panel (PDP), and/or one or more light emitting diodes (LEDs). The LED may include an organic LED (OLED). In an embodiment, the display panel 150 may include an electronic paper.

In an embodiment, the first circuit 130 may include a timing controller that generates a timing signal for outputting an image on the display panel 150. In an embodiment, the first circuit 130 may include an LED driving circuit for driving one or more LEDs included in the display panel 150. The LED may be integrated into a backlight and/or at least one pixel of the display panel 150. The LED driving circuit may control the voltage of the power signal to be provided to the one or more LEDs in order to adjust the brightness of the one or more LEDs in the display panel 150. The power signal may be provided from the power supply circuit 110 independently of other power signals to be supplied to other circuits different from the first circuit 130 among the multiple outputs from the power supply circuit 110.

Referring to FIG. 1, the display device 101 according to an example embodiment may include the second circuit 140 distinct from the first circuit 130 for driving the display panel 150. For example, the second circuit 140 may perform another function distinct from the function of the first circuit 130 (e.g., the function of adjusting the voltage of the power signal to be provided to the LED). The second circuit 140 may generate a signal representing an image to be displayed on the display panel 150 for providing to the first circuit 130. The second circuit 140 may include a processor and/or a memory for executing one or more functions in the display device 101.

In an embodiment, the second circuit 140 may be electrically connected to one or more switches to obtain a user input. The one or more switches may be exposed outside at least partially through a housing of the display device 101. In an embodiment, the second circuit 140 may include a communication circuitry for use in communicating with an external electronic device to obtain a user input, such as e.g., a remote control. The communication circuitry may communicate with the external electronic device based on a wireless communication protocol, such as e.g., infrared communication, Bluetooth and/or Wi-Fi. The second circuit 140 may include a printed circuit board (PCB) including at least one of a chipset for executing one or more functions, a processor, a memory, an electronic component, or wiring. In an embodiment, the second circuit 140 may have a form of a system-on-chip (SoC).

In an embodiment, the first circuit 130 may control one or more pixels in the display panel 150 based on a signal received from the second circuit 140. For example, the display panel 150 may include a plurality of pixels arranged in a two-dimensional matrix. In the above example, the first circuit 130 may control at least one pixel arranged in a corresponding row or column among the plurality of pixels based on the received signal. Controlling the at least one pixel by the first circuit 130 may include adjusting the luminance, the brightness, and/or color of the at least one pixel.

Although not shown, the display device 101 according to an example embodiment may include an output means to output information in other form, in addition to its visualized form. For example, the display device 101 may further include one or more speakers operating by a power signal supplied from the power circuit 110 to output an acoustic signal.

Referring to FIG. 1, the display device 101 according to an example embodiment may include the power circuit 110 to provide power to various loads such as the first circuit 130, the second circuit 140, and/or the display panel 150. The display device 101 may include at least one of a rectifier 112, a power factor corrector 114, an electromagnetic interference (EMI) filter 116 and/or a transformer 118, disposed in the power circuit 110. Hardware components that may be included in the power circuit 110 are not limited to the example of FIG. 1, and for example, the power circuit 110 may further include other circuits such as e.g., a DC-DC convertor, a lightning protection circuit, a varistor, a surge arrester, or the like.

The rectifier 112 according to an example embodiment may serve to rectify the AC signal of the power source 120 to output a rectified alternate current signal. For rectifying the AC signal, the rectifier 112 may include one or more diodes. For example, the rectifier 112 may include a bridge diode circuit that performs a full-wave rectification on the AC signal of the power source 120. For example, the power source 120 may perform a half-wave rectification on the AC signal. The circuit components included in the rectifier 112 are not limited to the bridge diodes, and may include a non-bridge type of circuit.

The EMI filter 116 according to an example embodiment may serve to remove or reduce noise included in the AC signal of the power source 120. The noise may include a voltage ripple caused by another frequency component different from the frequency component of the AC signal designed by a manufacturer to generate that AC signal. For example, an AC signal having reduced noise from the EMI filter 116 may be supplied to the rectifier 112. For example, the EMI filter 116 may include a line filter.

The power factor corrector 114 according to an example embodiment may include various circuitry to adjust a power factor (PF) of an AC signal and/or a DC signal supplied to the power circuit 110. The power factor may refer, for example, to a ratio between an active power consumed by a load and the apparent power supplied to the load. For example, the power factor corrector 114 may adjust the power factor by reducing a reactive power of the AC signal. For example, the power factor corrector 114 may adjust the power factor by increasing the active power of the AC signal. The power factor corrector 114 according to an example embodiment may synchronize phases of a voltage and a current of an AC signal received by the display device 101 to adjust the power factor.

The display device 101 according to an example embodiment may obtain a DC signal from the AC signal from the power source 120 based on the power factor corrector 114. With the DC signal being obtained from the AC signal, the display device 101 according to an example embodiment may change the power factor at an input side of the display device 101 of the display device 101 (e.g., one end of the display device 101 connected to the power source 120), based on the power factor corrector 114. For example, the display device 101 may receive a current based on a phase of a voltage of the AC signal in the power source 120, thereby improving the power factor in the power line connecting the power source 120 and the display device 101. The power factor in the power line connecting the power source 120 and the display device 101 may exceed, for example, a predetermined power factor threshold related to the harmonics regulations.

The display device 101 according to an example embodiment may generate different power signals for supplying to different circuits (e.g., the first circuit 130, the second circuit 140, and/or the display panel 150) of the display device 101, distinct from the power circuit 110, from the DC signal generated based on the power factor modified by the power factor corrector 114. In order to generate the different power signals to be provided to the different circuits, the display device 101 according to an example embodiment may include a transformer 118. Within the transformer 118, a relative position between multiple inductors may be determined by one or more cores. The structure of the transformer 118 in the power circuit 110 of the display device 101 according to an example embodiment will be described in greater detail below with reference to FIGS. 2A and 2B, 5, 6A, 7A and 7B, 9A and 13A.

The display device 101 according to an example embodiment may provide an inductance required for each of different circuits, from the transformer 118 generating different power signals to be provided to each of the different circuits of the display device 101. The inductance may include, for example, leakage inductance and/or magnetization inductance, resulting from inductive coupling between a multiplicity of inductors in the transformer 118. The leakage inductance and/or the magnetization inductance may be generated based on an interaction between magnetic fields induced in the plurality of inductances included in the transformer 118. An equivalent circuit of the transformer 118 based on the leakage inductance and/or the magnetization inductance will be described in greater detail below with reference to FIGS. 8, 9B and/or 13B. An operation performed by the display device 101 according to an example embodiment, based on the inductance provided from the transformer 118 will be described in greater detail below with reference to FIGS. 10, 11 and/or 12A, 12B, 12C and 12D.

As described above, the display device 101 according to an example embodiment may use the transformer 118 in the power circuit 110 to obtain different inductances (e.g., leakage inductance) required by each of the different circuits included in the display device 101. For example, the inductances obtained from the transformer 118 may be used to reduce the number of inductors to be included in the different circuits. In a state of obtaining the inductances using the transformer 118, the display device 101 according to an example embodiment may use the transformer 118 to generate power signals with different voltages each required by each of the different circuits in the display device 101.

Hereinafter, the structure of the transformer 118 included in the display device 101 according to an example embodiment will be described with reference to FIGS. 2A and 2B.

Figure 2A:
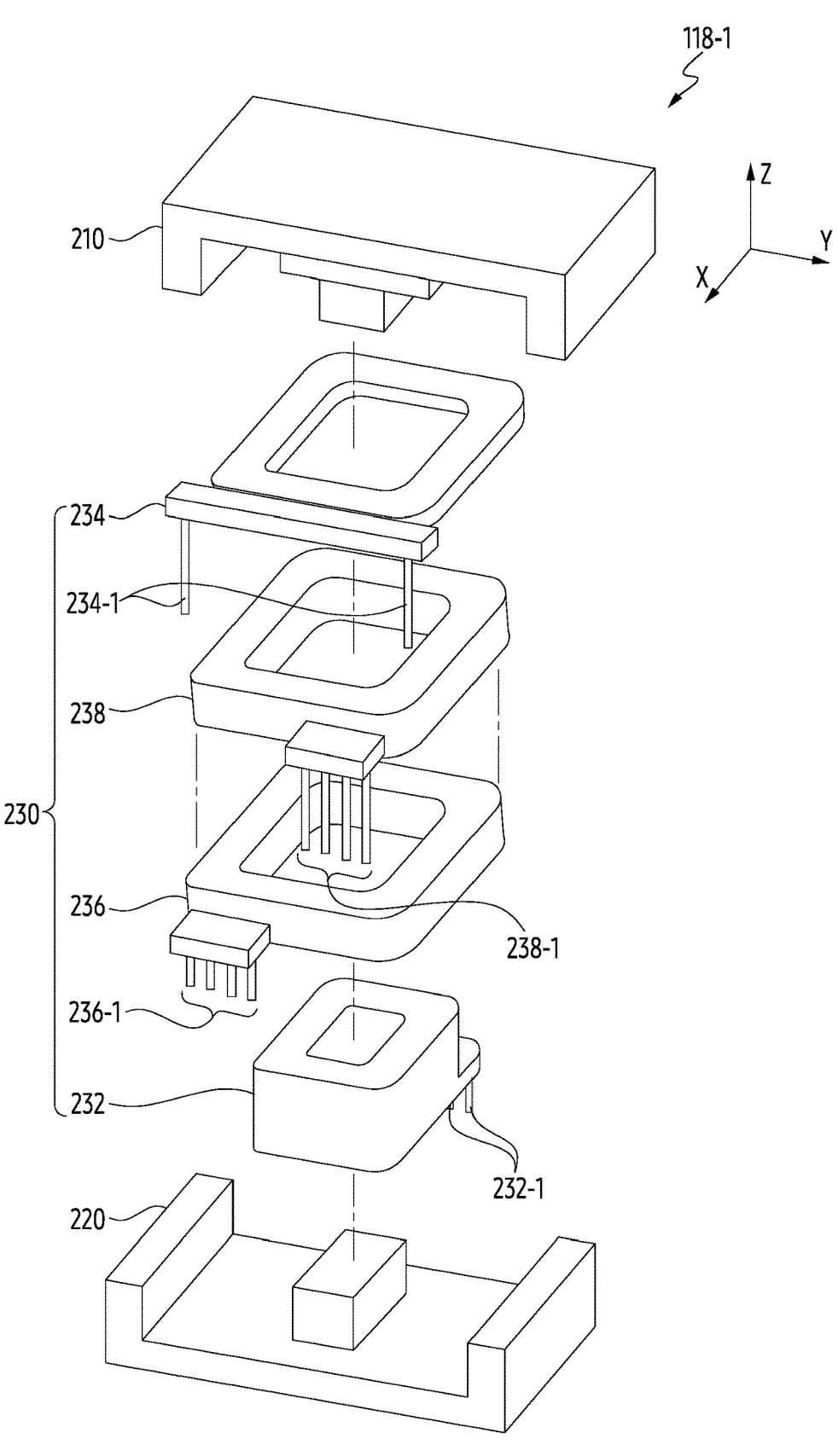
FIGS. 2A and 2B are an exploded perspective view and a perspective view, respectively, of a transformer included in a display device according to an exemplary embodiment.
Figure 2B:
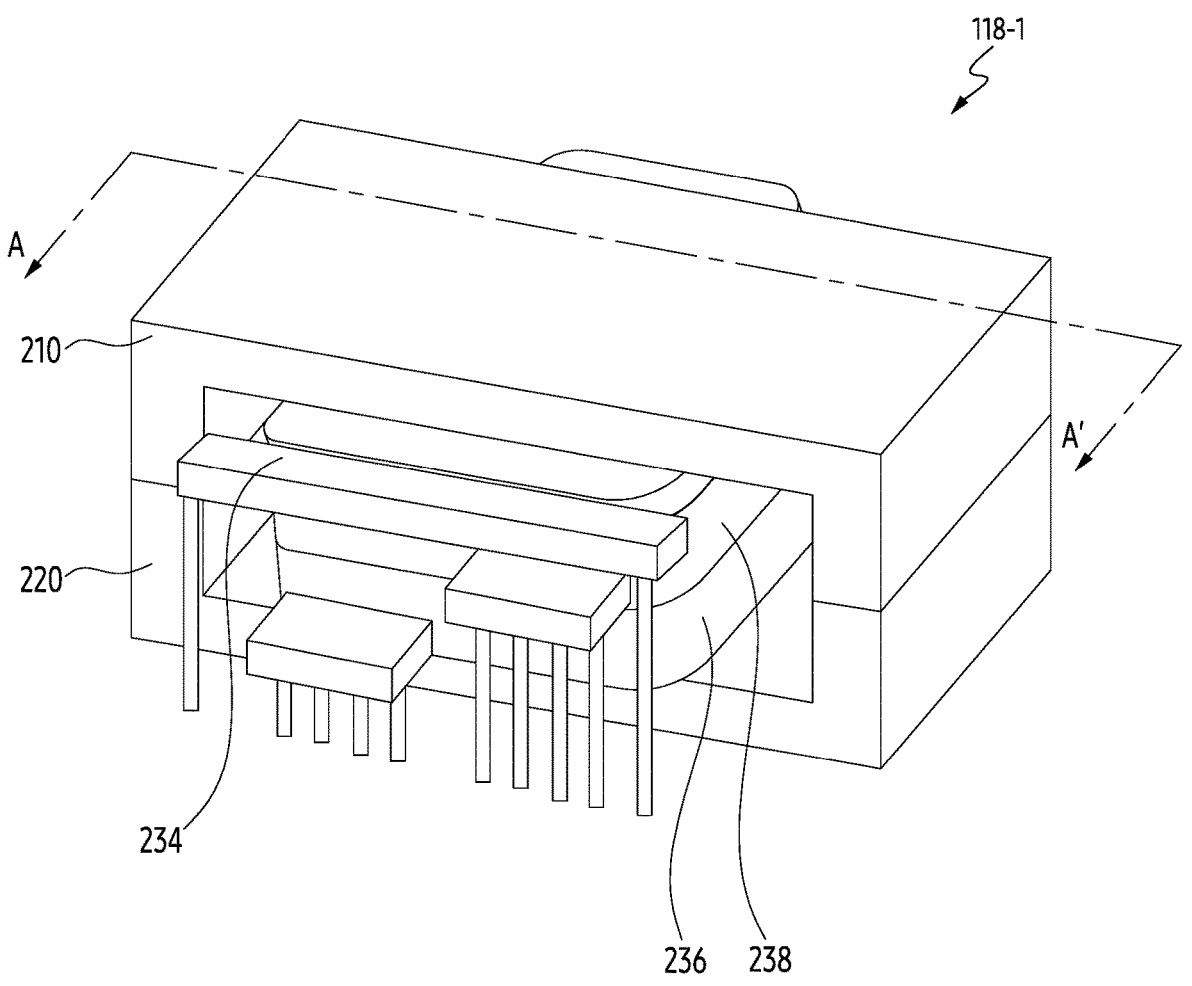

FIGS. 2A and 2B are diagrams illustrating an example transformer 118-1 included in a display device according to an exemplary embodiment. The display device of FIGS. 2A and 2B may correspond to the display device 101 of FIG. 1. The transformer 118-1 of FIGS. 2A and 2B may correspond to an example of the transformer 118 of FIG. 1.

FIG. 2A is an exploded perspective view of the transformer 118-1 included in the display device according to an example embodiment. The transformer 118-1 according to an example embodiment may include cores 210 and 220 and at least one inductor assembly 230 disposed between the cores 210 and 220. The inductor assembly 230 included in the transformer 118-1 may include two or more inductor sub-assemblies. Referring to an example of the transformer shown in FIG. 2A, an example of the inductor assembly 230 included in the transformer 118-1 may have a plurality of inductor sub-assemblies 232, 234, 236 and 238.

Each of the inductor sub-assemblies 232, 234, 236 and 238 of the transformer 118-1 according to an example embodiment may include a conductive wire through which current input to the transformer 118-1 flows and a bobbin around which the conductive wire is wound. In each of the inductor sub-assemblies, the conductive wire may form an inductor as the conductive wire extends to be wound around the bobbin. As the inductor formed in each of the inductor sub-assemblies 232, 234, 236 and 238 receives the current, magnetic flux may be induced in a space adjacent to the inductor sub-assemblies. The inductor sub-assemblies may further include at least one insulation member for insulating each other. The structures of the inductor sub-assemblies 232, 234, 236 and 238 included in the transformer 118-1 according to an example embodiment will be described in greater detail below with reference to FIG. 3.

Each of the inductor sub-assemblies 232, 234, 236 and 238 according to an example embodiment may include one or more pins corresponding to a portion of the conductive wire wound around the bobbin of the inductor assembly, the portion extending to the outside of the inductor assembly. Referring to FIG. 2A, there are shown pins 232-1, 234-1, 236-1 and 238-1 each included in each of inductor sub-assemblies 232, 234, 236 and 238. In an embodiment of FIG. 2A, the pins 232-1 included in the inductor sub-assembly 232 are oriented in −x direction, and the pins 234-1, 236-1 and 238-1 included in the inductor sub-assemblies 234, 236 and 238 are oriented in +x direction, which is distinguished from the −x direction. The orientation of the inductor sub-assemblies 232, 234, 236 and 238 each indicated by the pins 232-1, 234-1, 236-1 and 238-1 may be associated with inductive coupling of the inductors included in each of the inductor sub-assemblies 232, 234, 236 and 238 in the transformer 118-1. The orientation of the inductor sub-assemblies 232, 234, 236 and 238 is not limited to the embodiment illustrated in FIG. 2A, and the positional relation of the inductor sub-assemblies 232, 234, 236 and 238, distinct from the embodiment shown in FIG. 2A, will be described later with reference to FIG. 13A.

The transformer 118-1 according to an example embodiment may include one or more cores 210 and 220 for positioning the inductor assembly 230 within transformer 118-1. For example, the cores 210 and 220 may include a ferrite core with at least one of manganese-zinc (MnZn) ferrite or nickel-zinc (NiZn) ferrite. While the current flows through the inductor assembly 230 of the transformer 118-1, magnetic flux may be formed through the cores 210 and 220 included in the transformer 118-1. Based on the shape of each of the cores 210 and 220, the magnetic flux formed through the cores 210 and 220 may change. The magnetic flux changed based on the shape of each of the cores 210 and 220 may cause leakage inductance and/or magnetization inductance based on the inductive coupling of the inductor sub-assemblies included in the transformer 118-1. Referring again to FIG. 2A, the cores 210 and 220 may have different shapes, and the inductor assembly 230 may be arranged asymmetrically with respect to a plane onto which the cores 210 and 220 abut within the transformer 118-1.

Referring to FIG. 2A, the core 210 of the transformer 118-1 according to an example embodiment may include a first surface and a protrusion protruding from the first surface along a direction which the first surface faces. In the protrusion of the core 210, a cross-section of a first portion of the protrusion, perpendicular to the direction which the first surface of the core 210 faces, may have a first area. In the protrusion of the core 210, a cross-section of a second portion of the protrusion between the first portion of the protrusion and the first surface of the core 210, being perpendicular to the direction which the first surface of the core 210 faces, may have a second area larger than the first area. The shape of the core 210 according to an example embodiment will be described in greater detail below with reference to FIG. 4A.

Referring to FIG. 2A, the transformer 118-1 according to an example embodiment may include an inductor sub-assembly 232 including a bobbin having an opening corresponding to the first area and an inductor wound around the bobbin, so as to be in contact with an outer circumference of the first portion of the core 210. The transformer 118-1 according to an example embodiment may include an inductor sub-assembly 234 having a bobbin with an opening corresponding to the second area and an inductor wound around the bobbin, so as to be in contact with an outer circumference of the second portion of the core 210.

Referring to FIG. 2A, as the opening of the inductor sub-assembly 234 has the second area, the inductor sub-assembly 234 of the two inductor sub-assemblies 232 and 234 may be disposed adjacent to the first surface from which the protrusion extends. As the opening of the inductor sub-assembly 232 has the first area, the inductor sub-assembly 232 may be disposed to be spaced apart from the first surface of the core 210. For example, a distance between the inductor sub-assembly 232 and the first surface of the core 210 may correspond to a length of a second portion of the protrusion of the core 210 having the second area distinct from the first area. For example, the inductor sub-assembly 234 may fill up a space between the inductor sub-assembly 232 and the first surface of core 210.

Referring to FIG. 2A, as the protrusion of the core 210 is inserted into the openings of each of the inductor sub-assemblies 232 and 234, the opening of the inductor sub-assembly 234 may overlap at least a portion of the opening of the inductor sub-assembly 232. For example, the inductor sub-assembly 234 and the inductor sub-assembly 232 may abut onto each other, such that the opening of the inductor sub-assembly 234 overlaps at least a portion of the opening of the inductor sub-assembly 232. For example, the protrusion of the core 210 may pass through a portion where the opening of the inductor sub-assembly 234 and the opening of the inductor sub-assembly 232 are overlapped with each other.

Referring to FIG. 2A, the transformer 118-1 according to an example embodiment may include the inductor sub-assemblies 236 and 238 each including a bobbin including the opening corresponding to an outer circumference of the inductor sub-assembly 232, and an inductor wound around the bobbin. Within the transformer 118-1, the inductor sub-assemblies 236 and 238 may be in contact with different portions of the outer circumference of the inductor sub-assembly 232.

FIG. 2B is a perspective view of the transformer 118-1 included in the display device according to an example embodiment. Referring to FIG. 2B, the inductor sub-assemblies 232, 234, 236 and 238 included in the transformer 118-1 may be disposed in a space between the cores 210 and 220. As magnetic fluxes generated in each of the inductor sub-assemblies 232, 234, 236 and 238 are formed in the cores 210 and 220, inductive coupling may be formed between the inductors included in each of the inductor assemblies. Based on the inductive coupling, the leakage inductance and/or the magnetization inductance may be generated. For example, the leakage inductance and/or the magnetization inductance may be induced due to an interaction between the magnetic fluxes. The leakage inductance and/or the magnetization inductance may be used to drive another circuit (e.g., an LLC resonant converter) connected to the transformer 118-1. In the display device including the transformer 118-1 according to an example embodiment, the operation of utilizing the leakage inductance and/or the magnetization inductance generated in the transformer 118-1 will be described in greater detail below with reference to FIGS. 11 and 12A, 12B, 12C and 12D.

In the transformer 118-1 according to an example embodiment, at least one of the inductor sub-assemblies 232, 234, 236 and 238 may be configured to establish certain positional relation to lower a coupling factor with another one. The coupling factor may refer to a coupling coefficient of the inductive coupling between the inductors. As the coupling factor between at least two inductors of the inductor sub-assemblies get lower, the leakage inductance between the at least two inductors may increase. The positional relation may be determined based on the shape of at least one of the cores 210 and 220. For example, as the core 210 of those cores 210 and 220 has a shape suited for increasing the leakage inductance, the leakage inductance increased by the core 210 may be used to drive another circuit connected to the transformer 118-1. In this instance, the inductor installed to increase the inductance within the other circuit may be removed.

Figure 3:
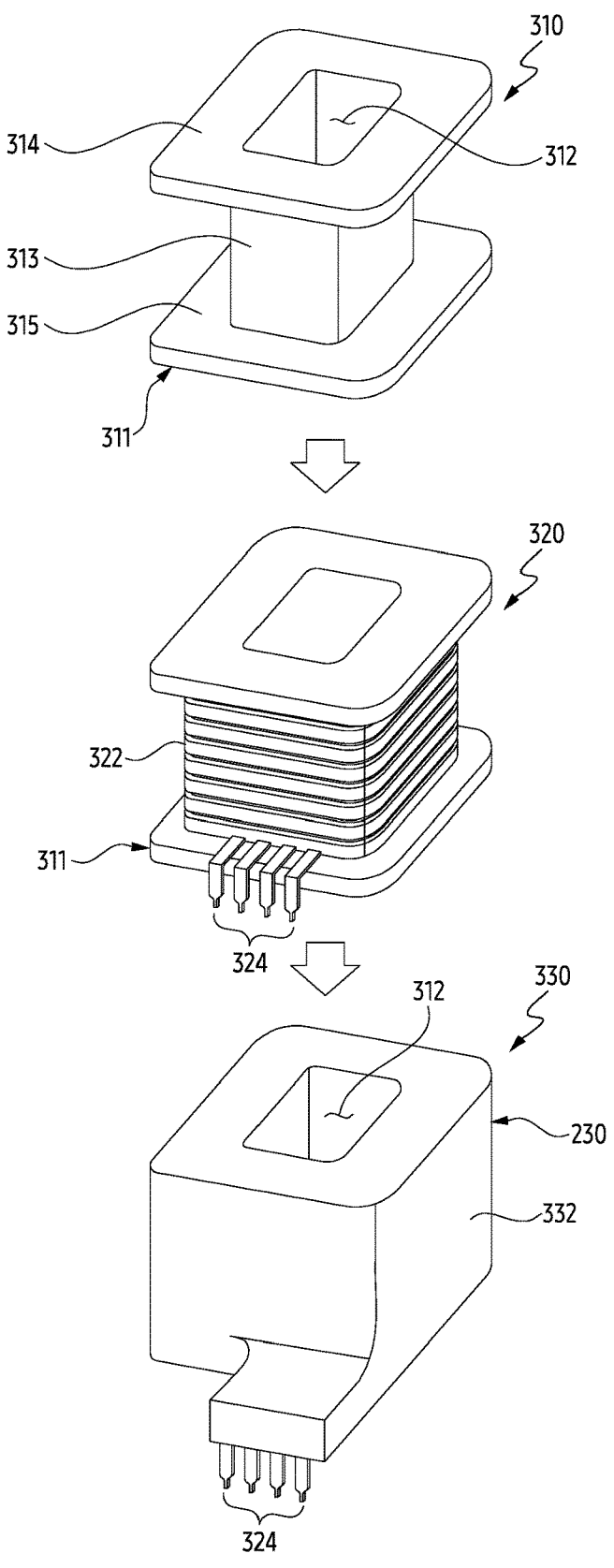
FIG. 3 is a diagram illustrating an example inductor assembly included in a display device according to an exemplary embodiment.

FIG. 3 is a perspective view of the inductor assembly 230 included in the display device according to an exemplary embodiment. The display device of FIG. 3 may correspond to the display device 101 of FIG. 1. The inductor assembly 230 of FIG. 3 may include the inductor assemblies 230 of FIG. 2A. Each of assembling stages 310, 320 and 330 of FIG. 3 may correspond to part of a process to make the inductor assembly 230 according to an example embodiment.

Referring to FIG. 3, in stage 310, a bobbin 311 to be included in the inductor assembly 230 is shown. The bobbin 311 may be made, for example, of at least one material of plastic, such as bakelite, or ceramic. The bobbin 311 may be manufactured, for example, with a plastic molding method using at least one of a transfer mold, an injection mold, or a blow mold.

In an embodiment of FIG. 3, the bobbin 311 may have an opening 312. For example, the bobbin 311 may include a tube portion 313 having an inner circumference corresponding to an area of the opening 312. The area of the opening 312 formed in the tube portion 313 may correspond to that of a cross-section of the protrusion of the core to be inserted into the opening 312 (e.g., the cores 210 and 220 of FIGS. 2A and 2B). The shape of the opening 312 formed in the tube portion 313 may correspond to that of one end of the protrusion of the core to be inserted into the opening 312. The length of the tube portion 313 may correspond to that of the protrusion of the core to be inserted into the opening 312.

In an embodiment of FIG. 3, the bobbin 311 may include flanges 314 and 315 extending in a direction perpendicular to the tube portion 313, from one end of the tube portion 313. With that the inductor assembly 230 being inserted into the protrusion of the core of the transformer, the flanges 314 and 315 may be in contact with a flange of another inductor sub-assembly of the inductor assembly 230, and/or one surface of the core.

Referring to FIG. 3, in stage 320, as a conductive wire is wound around the bobbin 311 of the inductor assembly 230, it may form an inductor 322. For example, the inductor 322 may be wound around the outer circumference of the tube portion 313. The length of the tube portion 313 may be related to the number of turns of the inductor 322 wound around the outer circumference of the tube portion 313. In the inductor assembly 230, both ends of the inductor 322 may extend on at least one of the flanges 314 and 315 of the bobbin 311. In an embodiment, the inductor assembly 230 may include a plurality of pins 324 connected to the inductor 322 extending on at least one of the flanges 314 and 315. The pins 232-1, 234-1, 236-1, and 238-1 of FIG. 2A may correspond to an example of the pins 324. For example, the number of pins 324 may correspond to the number of both ends of the inductor 322. For example, the number of pins 324 may exceed the number of both ends of the inductor 322 in order to branch and receive the current associated with the inductor. Referring to FIG. 3, the number of pins 324 corresponding to the inductor 322 may be four, as two pins are connectable to both ends of the inductor 322, respectively.

Referring to FIG. 3, in the stage 330, as molding is performed to cover at least a portion of the inductor 322, the each inductor assembly 230 may have a side cover 332. The side cover 332 may include an insulating material formed such that at least a portion of the inductor 322 covered by the side cover 332 is electrically insulated from the outside of the side cover 332. For example, the side cover 332 makes it possible to electrically insulate a conductive material of the inductor assembly 230 (e.g., the conductive wire forming the inductor 322), distinct from the pins 324, from the outside of the inductor assembly 230.

In an embodiment, the molding to cover at least a portion of the inductor 322 may be performed to retain the opening 312 formed by the tube portion 313 of the inductor assembly 230. For example, the protrusion of the core of the transformer may be inserted into the opening 312 of the inductor assembly 230 performed with the molding. Hereinafter, a structure of the transformer corresponding to the inductor assembly 230 will be described in greater detail below with reference to FIGS. 4A and 4B.

Figure 4A:
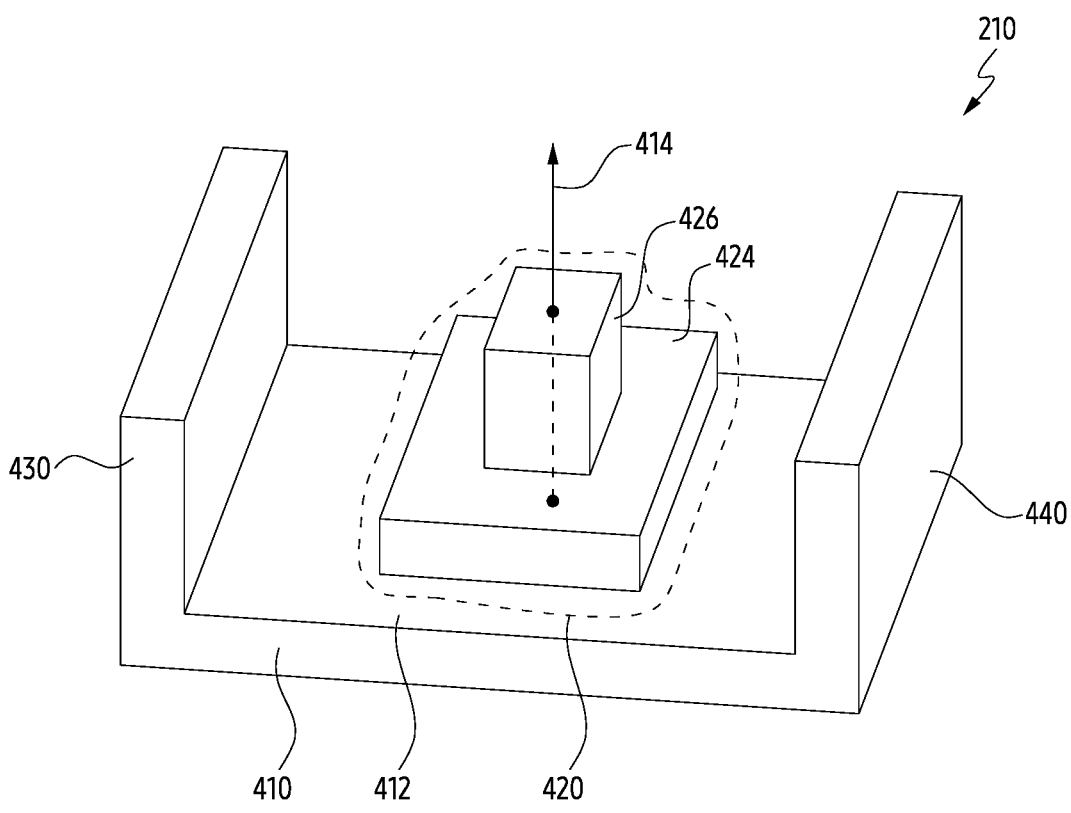
FIGS. 4A and 4B are perspective views illustrating example cores of a transformer included in a display device according to an exemplary embodiment.
Figure 4B:
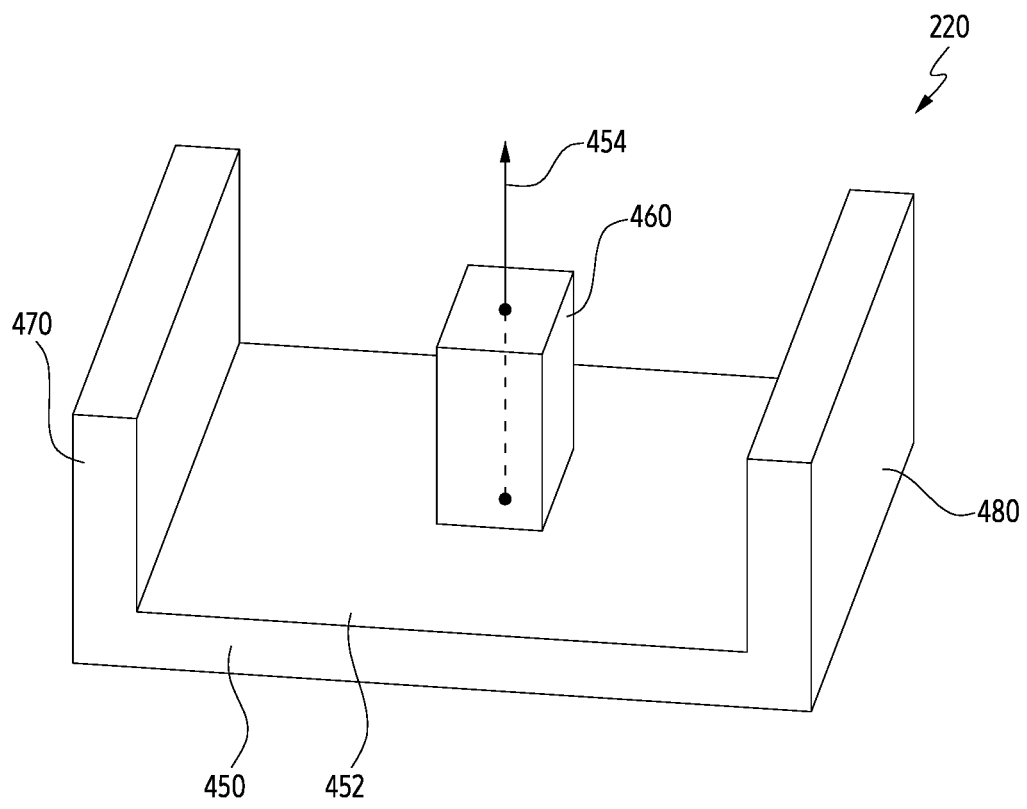

FIGS. 4A and 4B are perspective views illustrating the cores 210 and 220 of the transformer included in the display device according to an exemplary embodiment. The display device of FIGS. 4A and 4B may correspond to the display device 101 of FIG. 1. The transformers of FIGS. 4A and 4B may correspond to an example of the transformer of FIG. 1. For example, the transformer of FIGS. 4A and 4B may correspond to the transformer 118-1 of FIGS. 2A and 2B.

FIG. 4A, may illustrate the shape of the core 210 of the two cores 210 and 220 of FIGS. 2A and 2B. In an embodiment, the core 210 may include an extension 410 extending in both the longitudinal direction and the width direction. In an embodiment, the core 210 may include protrusions 420, 430 and 440 extending along a direction 414 which the first surface 412 faces (e.g., the direction normal to the first surface 412), protruding in different areas on the first surface 412 of the extension 410. For example, the protrusions 420, 430, and 440 may be spaced apart from each other in parallel.

Referring to FIG. 4A, the protrusion 420 included in the core 210 may extend from an area of the first surface 412 spaced apart from an edge of the first surface 412 of the extension 410. Hereinafter, the protrusion 420 may be referred to as a middle leg of the transformer and/or the core 210. The protrusion 420 may be inserted into an opening (e.g., the opening 312 of FIG. 3) of one or more inductor sub-assemblies (e.g., at least one of the inductor sub-assemblies 232, 234, 236 and 238 of FIG. 2A) included in the transformer. As the protrusion 420 is inserted into the opening, the protrusion 420 may fill up the opening. As the protrusion 420 is inserted into the opening, at least a portion of the inner circumference of the tube portion (e.g., the tube portion 313 of FIG. 2A) of the inductor sub-assembly with the opening being formed may be in contact with the protrusion 420.

Referring to FIG. 4A, the area of the cross-section of the protrusion 420 perpendicular to the direction 414 may vary depending on a distance between the cross-section and the first surface 412. For example, in a portion 426 of the protrusion 420, a cross-section perpendicular to the direction 414 may have the first area. For example, in a portion 424 of the protrusion 420, a cross-section perpendicular to the direction 414 may have the second area. Referring to FIG. 4A, the cross-section perpendicular to the direction 414 in the portion 424 may be larger than the cross-section perpendicular to the direction 414 in the portion 426. For example, the first area may be smaller than the second area.

The transformer according to an embodiment may include the inductor sub-assemblies having openings fitted into each of those sections 424 and 426. Referring to FIG. 2A, the area of the opening of the inductor sub-assembly 234 corresponding to the portion 424 of FIG. 4 may correspond to the second area. Similarly, the area of the opening of the inductor sub-assembly 232 of FIG. 2A corresponding to the portion 426 may correspond to the first area. In that case, the protrusion 420 of the core 210 may be inserted into the opening of the inductor sub-assembly 234 of FIG. 2A, and then inserted into the opening of the inductor sub-assembly 232 of FIG. 2A.

Referring to FIG. 4A, the protrusions 430 and 440 included in the core 210 may extend at a part of an edge in the first surface 412 of the extension 410 (e.g., a portion of the edge region, being perpendicular to the longitudinal direction on the first surface 412). For example, the protrusions 430 and 440 may be spaced apart from each other at least by the length of the first surface 412. The protrusions 430, 440 may be referred to as an outer leg of the transformer and/or the core 210. The protrusions 430 and 440 may be disposed distinct from the portion of the cores 210 and 220 in which the inductor is wound, and correspond to a portion which the cores 210 and 220 are in contact with each other. In an embodiment, a first length of the protrusions 430 and 440 extending from the first surface 412 may exceed a second length of the protrusions 420 extending from the first surface 412. An air gap may be formed in the transformer based on a difference between the first length and the second length.

Referring to FIG. 4B, the shape of the core 220 of the two cores 210 and 220 of FIGS. 2A and 2B is illustrated. The core 220 may include an extension 450 having a dimension corresponding to the extension 410 of FIG. 4A. For example, the length and width of the extension 450 may correspond to those of the extension 410 of FIG. 4A. In an embodiment, the core 220 may include one or more protrusions 460, 470 and 480 extending along the direction which the first surface 452 faces (e.g., the direction 454 normal to the first surface 452), protruding from the first surface 452 of the extension 450.

In an embodiment, the first surface 452 of the extension 450 with the protrusions 460, 470 and 480 may be spaced apart from and facing the first surface 412 of FIG. 4A within the transformer. As the first surface 452 and the first surface 412 of FIG. 4A are spaced apart from and facing each other, one end of each of the projections 460, 470, 480 of FIG. 4B and a corresponding end of each of the projections 420, 430, 440 of FIG. 4A may be arranged to face each other within the transformer.

Referring to FIG. 4B, the protrusion 460 may protrude, from the first surface 452 of the core 220, at a region spaced apart from an edge of the first surface 452. For example, the protrusion 460 may be referred to as a middle leg of the transformer and/or the core 220. The protrusion 460 may be inserted into an opening of one or more inductor sub-assemblies included in the transformer. An area of a cross-section of the protrusion 460 perpendicular to the direction 454 may correspond to that of an opening of the inductor sub-assembly into which the protrusion 460 is to be inserted. In an embodiment, the area of the cross-section of the protrusion 460 perpendicular to the direction 454 may remain independent of a distance between the first surface 452 and the cross-section. For example, the area of the cross-section of the protrusion 460 perpendicular to the direction 454 may correspond to the first area of the cross-section of the portion 426 of the protrusion 420 in FIG. 4A.

The transformer according to an embodiment may include one or more inductor sub-assemblies having an opening that fits onto the protrusion 460. Referring to FIG. 2A, the area of the opening of the inductor sub-assembly 232 corresponding to the core 220 may correspond to the first area, which is the area of the cross-section of the protrusion 460 or the area of the cross-section of the portion 426 of the protrusion 420 of FIG. 4A. In this instance, each of the protrusion 460 of the core 220 and the portion 426 of the protrusion 420 of FIG. 4A may be inserted into the opening of the inductor sub-assembly 232 of FIG. 2A, along different directions (e.g., opposite directions) of the opening of the inductor sub-assembly 232. For example, each of different portions of the inner circumference of the inductor sub-assembly 232 of FIG. 2A may come into contact with the protrusion 460 of the core 220 of FIG. 4B and the portion 426 of the protrusion 420 of the core 210 of FIG. 4A.

Referring to FIG. 4B, the protrusions 470 and 480 included in the core 220 may extend from a part of an edge of the first surface 452 of the extension 450 (e.g., a part of the edge perpendicular to the longitudinal direction of the first surface 452). Hereinafter, the protrusions 470 and 480 may be referred to as an outer leg of the transformer and/or the core 220. For example, a first length by which the protrusions 470 and 480 extend from the first surface 452 may exceed a second length by which the protrusion 460 extends from the first surface 452. In each of the cores 210 and 220, when the length of the outer leg exceeds that of the middle leg, the protrusions 420 and 460 corresponding to the middle leg may be spaced apart within the transformer. In this instance, an air gap may be formed between the protrusions 420 and 460 corresponding to the middle leg.

As described above, as the protrusions 420 and 460 corresponding to the middle leg in the cores 210 and 220 have different shapes, a first coupling factor between a first inductor sub-assembly and a second inductor sub-assembly of the inductor sub-assemblies included in the transformer may be distinguished from a second coupling factor between the first inductor sub-assembly and a third inductor sub-assembly. Each of the first and second coupling factors, being distinct from each other, may be related to different circuits of the display device connected to the transformer. For example, each of the first coupling factor and the second coupling factor may be used to provide an inductance required by each of the different circuits.

Hereinafter, a positional relation between plural inductor assemblies assembled into a transformer including the cores 210 and 220 of FIGS. 4A and 4B will be described in greater detail with reference to FIG. 5.

Figure 5:
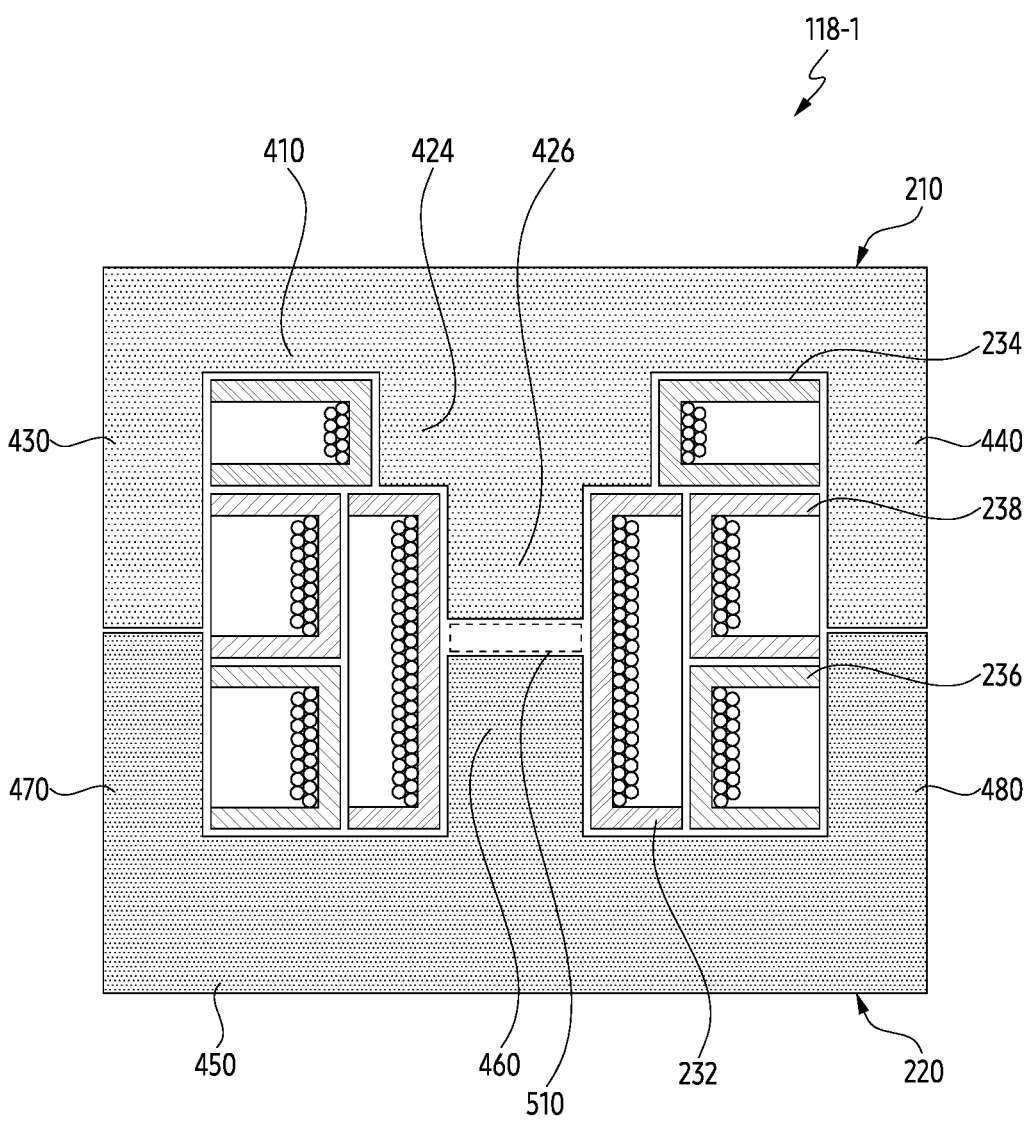
FIG. 5 is a cross-sectional view of the transformer taken along a line A-A' of FIG. 2B according to an embodiment.

FIG. 5 is a cross-sectional view of the transformer 118-1 taken along a line A-A' of FIG. 2B. The display device of FIG. 5 may correspond to the display device 101 of FIG. 1. The transformer 118-1 of FIG. 5 may correspond to transformer 118-1 of FIGS. 2A and 2B.

Referring to FIG. 5, as the shapes of the protrusions inserted into the openings of the inductor sub-assemblies 232, 234, 236 and 238 are different from each other, the cores 210 and 220 may have asymmetry with respect to a surface perpendicular to the surface with which the cores 210 and 220 come into contact. For example, among the protrusions of the core 210, an area of a cross-section of the portion 424 corresponding to a certain inductor sub-assembly 234 of the inductor sub-assemblies 232, 234, 236 and 238 may be different from that of a cross-section of the portion 426 corresponding to other inductor assembly (e.g., the inductor sub-assembly 232) of the inductor sub-assemblies 232, 234, 236 and 238.

Referring to FIG. 5, the portion 424 of the protrusion of the core 210 may be inserted into the opening of the inductor sub-assembly 234. As the portion 424 is inserted into the opening of the inductor sub-assembly 234, the inductor of the inductor sub-assembly 234 may be wound around the portion 424. The portion 426 of the protrusion of the core 210 may be inserted into the opening of the inductor sub-assembly 232. As the portion 426 is inserted into the opening of the inductor sub-assembly 232, the inductor of the inductor sub-assembly 232 may be wound around the portion 426. The inductor sub-assembly 232 with the portion 426 of the core 210 being inserted into the opening may be inserted into the opening being formed in the inductor sub-assemblies 236 and 238 and corresponding to the outer circumference of the inductor sub-assembly 232. The portion 460 of the core 220 may be inserted into the opening of the inductor sub-assembly 232, being inserted into the opening of the inductor sub-assemblies 236 and 238, into which the portion 426 of the core 210 being inserted from a first direction, along a second direction distinct from the first direction. Referring to FIG. 5, the inductor of the inductor sub-assembly 238 positioned closer to the core 210 of the inductor sub-assemblies 236 and 238 may be wound around the outer circumference of the inductor sub-assembly 232 and/or the portion 426 of the core 210. The inductor of the inductor sub-assembly 236 located closer to the core 220 of the inductor sub-assemblies 236 and 238 may be wound around the outer circumference of the inductor sub-assembly 232 and/or the protrusion 460 of the core 220.

Referring to FIG. 5, the flanges and/or the tube portions included in each of the inductor sub-assemblies 232, 234, 236 and 238 may have a shape and/or a dimension adapted for alignment of the inductor sub-assemblies 232, 234, 236 and 238 in the transformer 118-1. For example, a length of the tube portion of the inductor sub-assembly 234 may correspond to that of the portion 424 of the protrusion of the core 210 of the transformer 118-1. For example, the flange of the inductor sub-assembly 234 may be shaped to cover one surface between the portion 424 and the protrusion 430, in the extension 410 of the core 210. For example, the length of the tube portion of the inductor sub-assembly 232 may correspond to a value subtracted from a sum of the lengths of the protrusions 430 and 470 abutting each other and corresponding to the outer leg, by the length of the portion 424 distinguished from the portion 426 of the core 210 into which the inductor sub-assembly 232 is inserted. For example, the sum of the lengths of the tube portions of the inductor sub-assemblies 236 and 238 may correspond to the length of the tube portion of the inductor sub-assembly 232. For example, the flange of the inductor sub-assembly 236 and the inductor sub-assembly 232 may have a shape to fill up a cross-section of a space between the portion 426 and the protrusion 430 of the core 210. For example, the flange of the inductor sub-assembly 232, with the tube portion and the portion 426 of the inductor sub-assembly 232 contacting each other, may have a dimension to contact a surface perpendicular to the tube portion of the inductor sub-assembly 232 at the portion 424 and the entire flange of the inductor sub-assembly 234.

In the transformer 118-1 according to an example embodiment, one end of the portion 426 of the protrusion of the core 210 and one end of the protrusion 460 of the core 220 may be spaced apart from each other, facing each other, so as to form an air gap 510 between the protrusion of the core 210 and the protrusion 460 of the core 220, corresponding to the middle leg. The air gap 510 may have a certain thickness associated with the inductive coupling in between the inductor sub-assemblies 232, 234, 236 and 238. For example, the cross-section of the air gap 510 may have a shape corresponding to one end of the portion 426 of the protrusion of the core 210. When the outer legs of the cores 210 and 220 are in contact with each other, for example, the protrusions 430 and 470 and the protrusions 440 and 480 come into contact with each other, the thickness of the air gap 510 may correspond to a difference between a sum of the lengths of the outer legs (e.g., a sum of the lengths of the protrusions 430 and 470) and a sum of the lengths of the middle legs (e.g., a sum of the lengths of the portions 424 and 426 of the protrusions and the protrusions 460).

In an embodiment illustrated in FIG. 5, as an alternating (AC) current is applied to the inductor included in the inductor sub-assembly 232, the inductor in the inductor sub-assembly 232 may radiate magnetic flux. The radiated magnetic flux may cause a current to flow through the inductors included in each of the inductor sub-assemblies 234, 236 and 238 included in the transformer 118-1. For example, in a state that the AC current flows through the inductor included in the inductor sub-assembly 232, the inductors included in each of the inductor sub-assemblies 234, 236 and 238 may output a current based on the AC current. The current output from each inductor included in each of the inductor sub-assemblies 234, 236 and 238 may change depending on the inductive coupling between the corresponding inductor and the inductor of the inductor sub-assembly 232. For example, the current output from the inductor of the inductor sub-assembly 234 may be generated based on the leakage inductance and/or the magnetization inductance formed between the inductor of the inductor sub-assembly 234 and the inductor of the inductor sub-assembly 232. For example, the current output from the inductor of the inductor sub-assembly 236 may be generated based on the leakage inductance and/or the magnetization inductance between the inductor of the inductor sub-assembly 236 and the inductor of the inductor sub-assembly 232.

In FIG. 5, a coupling coefficient between the inductors included in each of inductor sub-assemblies 232, 234, 236 and 238 may be determined based on a position between the inductor sub-assemblies 232, 234, 236 and 238 in transformer 118-1. The coupling coefficient may be inversely proportional to the leakage inductance. For example, since the entire inductor sub-assemblies 232, 236 and 238 are wound around the portion 426 of the protrusion of the core 210 and the portion 460 of the core 220 having a cross-sectional area corresponding to the cross-sectional area of the portion 426, and are disposed to be in contact with each other, the coupling coefficient between the inductor sub-assemblies 232, 236 and 238 may be relatively high. For example, the coupling coefficient between the inductor sub-assemblies 232 and 236 and the coupling coefficient between the inductor sub-assemblies 232 and 238 may be substantially the same as each other, since the inductor assemblies 236 and 238 are arranged symmetrically with respect to the inductor sub-assembly 232. Further, since coupling coefficients are substantially the same, the leakage inductances between the inductor sub-assemblies 236 and 238 may be also substantially the same.

For example, the inductor sub-assembly 234 may have a relatively smaller coupling coefficient as compared to the inductor sub-assemblies 236 and 238, because it is wound around the portion 424 of the protrusion of the core 210, having the area different from the portion 426 of the protrusion of the core 210 and different from the protrusion 460 of the core 220 where the inductor sub-assemblies 232, 236 and 238 are sound around, and is disposed relatively spaced apart from the inductor sub-assembly 232 as compared to the inductor sub-assemblies 236 and 238. Since the inductor sub-assembly 234 has a relatively smaller coupling coefficient, other circuits connected to the transformer 118-1 may obtain a relatively larger leakage inductance using the inductor sub-assembly 234. In an embodiment, the leakage inductance obtained based on the inductor sub-assembly 234 may be related to a difference in the shapes (and/or its cross-sectional areas) of the portion 424 and the portion 426 of the protrusion of the core 210. For example, as the difference in the cross-sectional areas of the portion 424 and the portion 426 of the protrusion of the core 210 increases, the leakage inductance corresponding to the inductor sub-assembly 234 may increase. For example, the leakage inductance corresponding to the inductor sub-assembly 234 may increase, as the cross-sectional area of the portion 424 is increased while the cross-sectional area of the portion 426 of the protrusion is maintained.

Figure 6A:
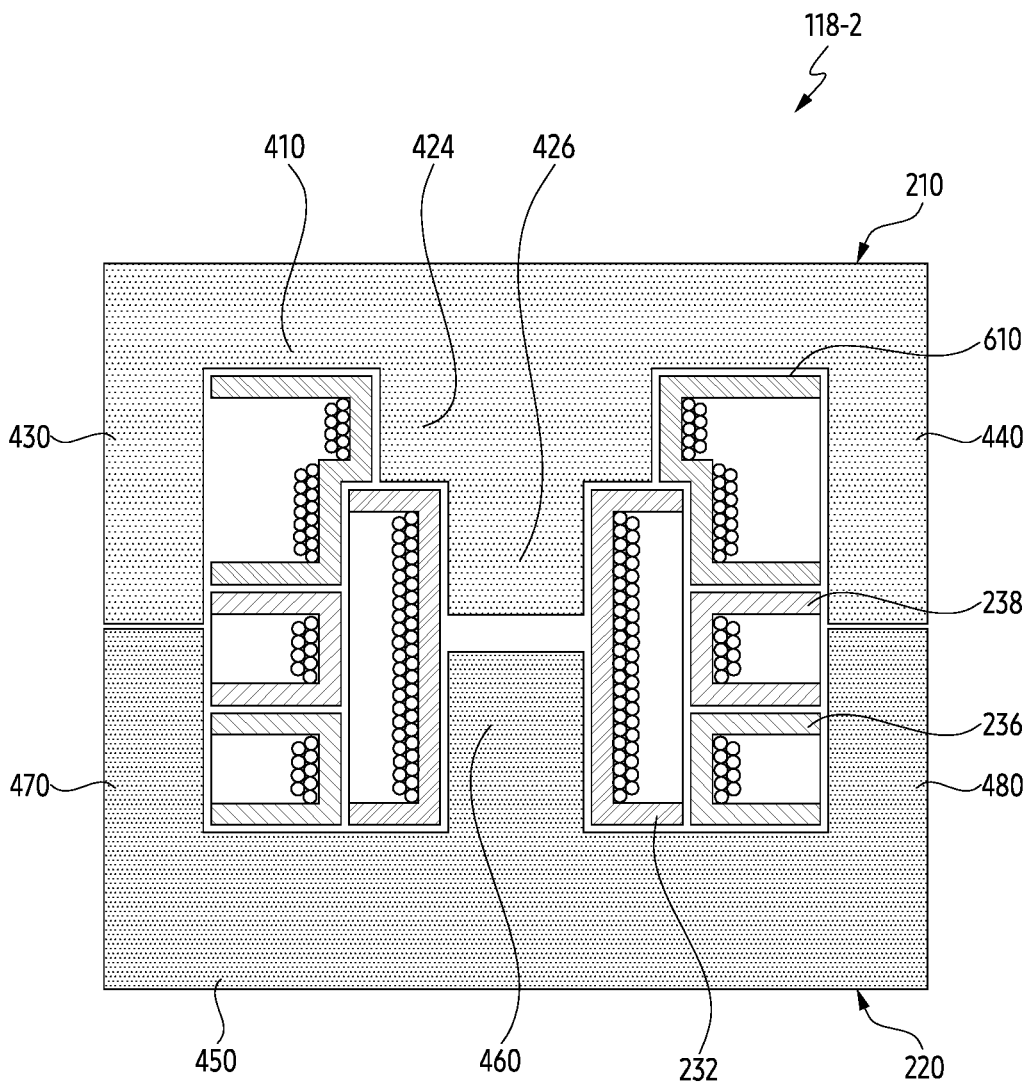
FIGS. 6A and 6B are diagrams illustrating an example of a transformer included in a display device according to an exemplary embodiment.
Figure 6B:
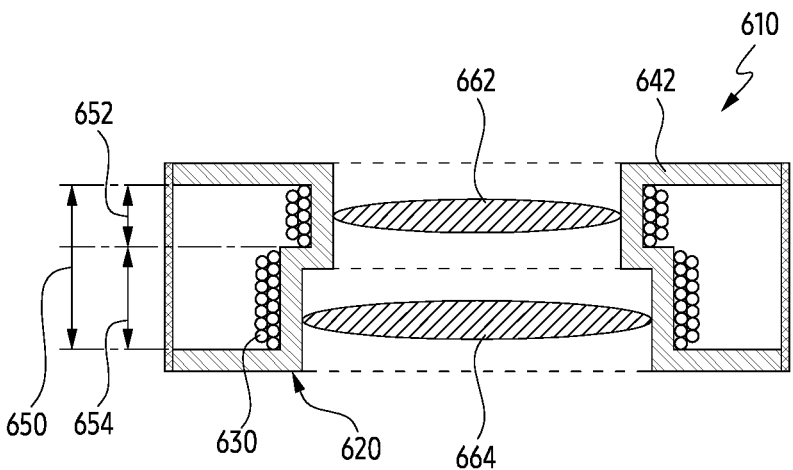

FIGS. 6A and 6B are diagrams illustrating an example of a transformer 118-2 included in a display device according to an exemplary embodiment. The display device of FIGS. 6A and 6B may correspond to the display device 101 of FIG. 1. The transformer 118-2 of FIGS. 6A and 6B may correspond to an example of the transformer 118 of FIG. 1.

FIG. 6A is a cross-sectional view of the transformer 118-2 included in the display device according to an example embodiment. For example, FIG. 6A shows a cross-sectional taken along an axis including the middle leg (e.g., the protrusion of the core 210 including the portions 424 and 426 and the protrusion 460 of the core 220) of a transformer 118-2 and extending between the outer legs (e.g., the protrusions 430, 440, 470 and 480). Referring to FIG. 6A, the transformer 118-2 according to an example embodiment may include at least two cores 210 and 220 and the inductor sub-assemblies 232, 236, 238 and 610 disposed between the cores 210 and 220. Hereinafter, in describing the inductor sub-assemblies 232, 236 and 238 and the cores 210 and 220, the description overlapping the corresponding portions of FIGS. 2A, 2B, 3, 4A and 4B, and 5 will be omitted.

Referring now to FIG. 6A, the transformer 118-2 according to an example embodiment may obtain the number of turns of the inductor required for driving another circuit connected to the inductor sub-assembly 610, using the inductor sub-assembly 610. The portion 424 of the protrusion of the core 210 may be inserted into an opening included in the inductor sub-assembly 610 along a first direction. With the portion 424 being inserted into the opening of the inductor sub-assembly 610 along the first direction, the inductor sub-assembly 232 may be inserted into the opening included in the inductor sub-assembly 610 along a second direction distinct from the first direction. A first flange in contact with the core 210 and a second flange in contact with the inductor sub-assembly 238 among the flanges of the inductor sub-assembly 610 may have shapes and/or dimensions independent of each other. For example, the first flange may have a shape to fill up a space between the portion 424 and the protrusion 430 in the core 210. For example, the second flange may have a shape corresponding to the flange of the inductor sub-assembly 238.

FIG. 6B is a diagram illustrating an example structure of the inductor sub-assembly 610 of FIG. 6A. In an embodiment, a length of a tube portion 650 of the inductor sub-assembly 610 may be of a length to secure the number of turns of the conductive wire required for the inductor sub-assembly 610. When the length for securing the number of turns of the conductive wire required for the inductor sub-assembly 610 is distinguished from the length of the portion 424 of the projection corresponding to the inductor sub-assembly 610, the inductor sub-assembly 610 may have an opening to receive an outer circumference of another inductor sub-assembly (e.g., the inductor sub-assembly 232 of FIG. 6A) abutting onto the inductor sub-assembly 610.

Referring to FIG. 6B, a cross-section of the tube portion 650 included in the inductor sub-assembly 610 is shown. An opening in a first portion 652 of the tube portion 650 may correspond to the portion 424 of the protrusion of the core 210, as the inductor sub-assembly 610 is disposed within the transformer 118-2. For example, a cross-sectional area 662 of the opening in the first portion 652 may correspond to the cross-sectional area of the portion 424 of the protrusion of the core 210. The flange 642 adjacent to the first portion 652 in the inductor sub-assembly 610 may have a shape to fill up the first surface of the extension 410 from which the protrusion extends in the core 210, since the opening of the first portion 652 corresponds to the portion 424 of the protrusion of the core 210.

Referring to FIG. 6B, in the inductor sub-assembly 610 according to an example embodiment, an opening of a second portion 654 of the tube portion 650 may correspond to an outer circumference of another inductor sub-assembly (e.g., the inductor sub-assembly 232) distinguished from the protrusion of the core 210, as the inductor sub-assembly 610 is disposed within the transformer 118-2. For example, a cross-sectional area 664 of the opening in the second portion 654 may correspond to the cross-sectional area of an outer circumference of the other inductor sub-assembly. A flange 620 positioned adjacent to the second portion 654 in the inductor sub-assembly 610 may have a shape to fill up the outer circumference of the other inductor sub-assembly and the outer leg of the core 210 (e.g., the protrusions 430 and 440 of the core 210), since the opening of the second portion 654 corresponds to the other inductor sub-assembly.

As the inductor sub-assembly 610 according to an example embodiment is distinguished from the first portion 652 corresponding to the portion 424 of the protrusion of the core 210, and includes the second portion 654 around which at least part of the inductor 630 is wound, the number of turns of the inductor 630 included in the inductor sub-assembly 610 may increase. As described above, as the inductor sub-assembly 610 is wound around the protrusion (e.g., the portion 424) distinguished from the protrusion (e.g., the portion 426 and the protrusion 460 of the core 220) around which the other inductor sub-assemblies 232, 236 and 238 are wound, within the transformer 118-2, the inductor sub-assembly 610 can provide relatively larger leakage inductance. As the inductor sub-assembly 610 further includes the second portion 654, the inductor sub-assembly 610 can provide an increased leakage inductance based on the number of turns increased by the second portion 654.

Hereinafter, an example of a transformer having a structure different from that of the transformer 118-2 of FIGS. 6A and 6B will be described in greater detail below with reference to FIGS. 7A and 7B.

Figure 7A:
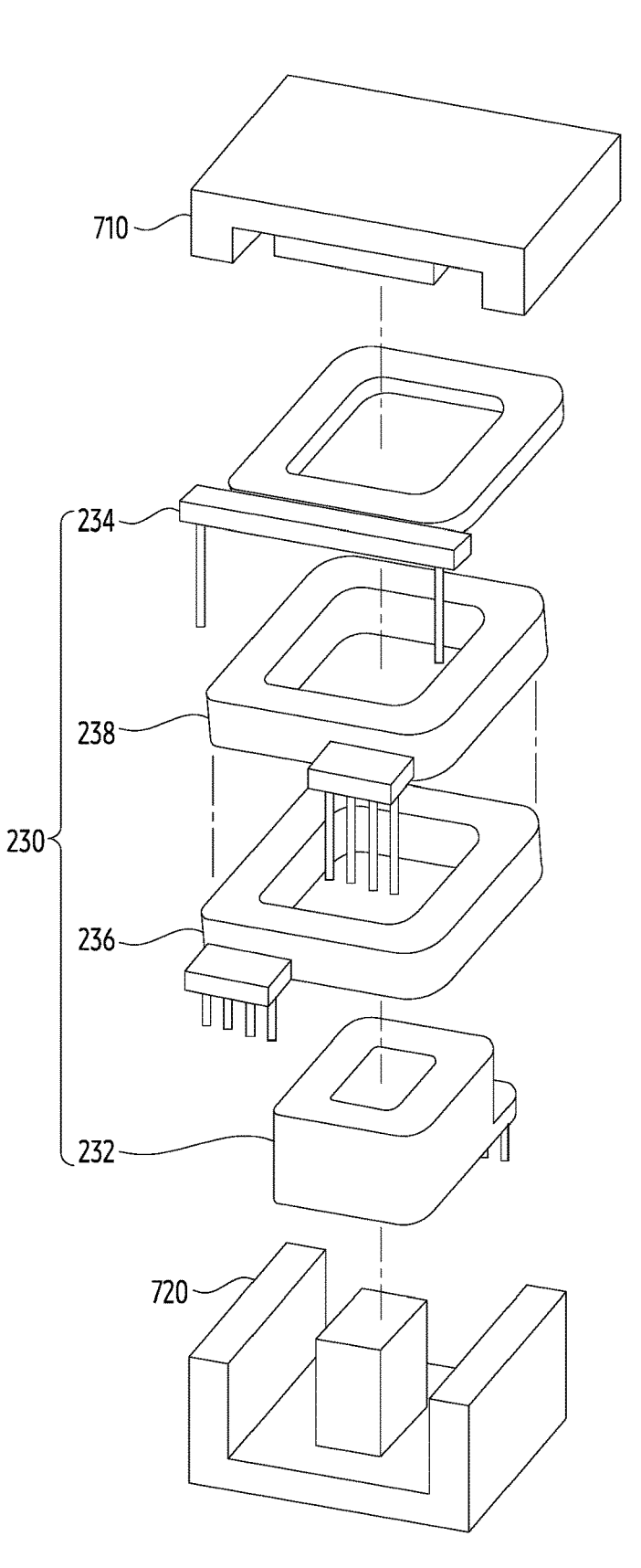
FIGS. 7A and 7B are diagrams illustrating an example of a transformer included in a display device according to an exemplary embodiment.
Figure 7B:
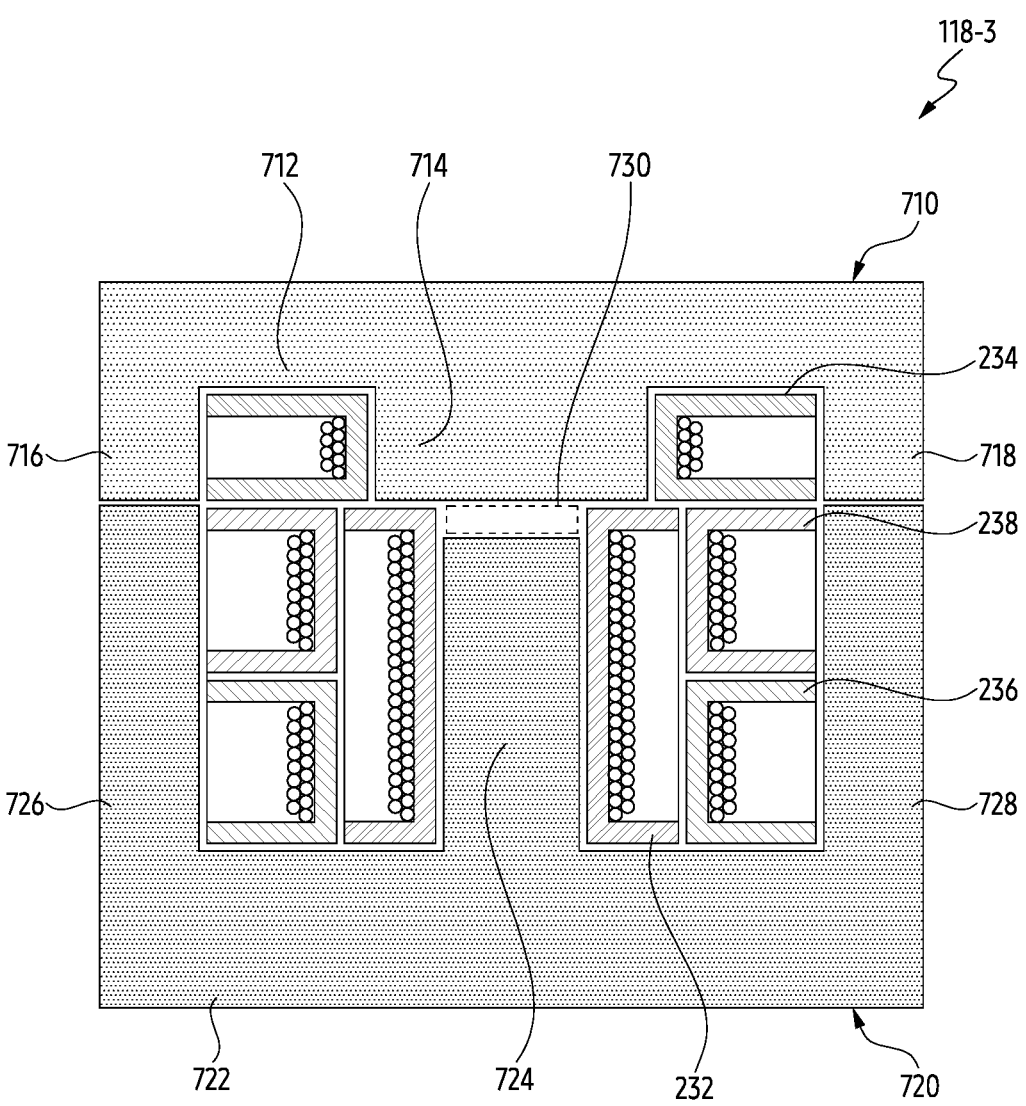

FIGS. 7A and 7B are diagrams illustrating an example of a transformer 118-3 included in a display device according to an exemplary embodiment. The display device of FIGS. 7A and 7B may correspond to the display device 101 of FIG. 1. The transformer 118-3 of FIGS. 7A and 7B may correspond to an example of the transformer 118 of FIG. 1.

FIG. 7A is an exploded perspective view of the transformer 118-3 included in the display device according to an example embodiment. The transformer 118-3 according to an example embodiment may include cores 710 and 720 and an inductor assembly 230 disposed between the cores 710 and 720. Referring to FIG. 7A, the inductor sub-assemblies 232, 234, 236 and 238 included within transformer 118-3 are shown. In describing the cores 710 and 720 and the inductor assembly 230, the description overlapping the corresponding portions of FIGS. 2A, 2B and 3 may not be repeated here for convenience of explanation.

The cores 710 and 720 of the transformer 118-3 according to an example embodiment may include protrusions having different cross-sectional areas. The protrusions may be inserted into openings of different inductor sub-assemblies included in the transformer 118-3. For example, the core 710 may include a first surface, and a protrusion protruding from the first surface along a direction which the first surface faces and having a first area in a cross-section perpendicular to the direction which the first surface faces. The inductor sub-assembly 234 with an opening for inserting the protrusion of the core 710 thereto, may include a bobbin including an opening corresponding to the first area, so as to be in contact with an outer circumference of the protrusion of the core 710, and an inductor wound around the bobbin. The core 720 may include a second surface spaced apart from and facing the first surface of the core 710, and a protrusion protruding from the second surface along a direction in which the second surface faces and having a second area, distinct from the first area, in a cross-section perpendicular to the direction in which the second surface faces. The inductor sub-assembly 232 with the opening for inserting the protrusion of the core 720 thereto may include a bobbin having an opening corresponding to the second area, so as to be in contact with an outer circumference of the protrusion of the core 720, and an inductor wound around the bobbin.

Since the protrusions included in each of the cores 710 and 720 have different shapes, the inductor assembly 230 may be asymmetrically disposed within the transformer 118-3. For example, the inductor assemblies 236 and 238 may include an opening corresponding to the outer circumference of the inductor sub-assembly 232, and the inductor sub-assembly 232 may be inserted into the opening of the inductor assemblies 236 and 238. In this case, the inductor sub-assemblies 232, 236 and 238 may be wound around the protrusion of the core 720, and the inductor sub-assembly 234 may be wound around the protrusion of the core 710. In each of the cores 710 and 720, the protrusions corresponding to the middle leg have different shapes and/or cross-sectional areas, so relatively high leakage inductance may be generated in the inductor sub-assembly 234 wound around the protrusion (e.g., the protrusion of the core 710) different from the protrusion of the core 720 around which the inductor sub-assemblies 232, 236 and 238 are wound.

FIG. 7B is a cross-sectional view of the transformer 118-3 included in the display device according to an example embodiment. For example, FIG. 7B shows a cross-sectional view taken along an axis connecting between the protrusions 716, 718, 726 and 728 of the cores 710 and 720 and including the protrusions 714 and 724 of the cores 710 and 720 around which the inductors of inductor sub-assemblies 232, 234, 236 and 238 are wound.

Referring to FIG. 7B, each of the cores 710 and 720 may include extensions 712 and 722, and protrusions 714, 716, 718, 724, 726 and 728 each protruding from different areas in each of the extensions 712 and 722. In describing the cores 710 and 720, the description overlapping those of FIGS. 4A and 4B and FIG. 5 may not be repeated here. Referring to FIG. 7B, each of the protrusions 714 and 724 for inserting into the opening of at least one of the inductor sub-assemblies 230 in each of the cores 710 and 720 may have a different cross-sectional area. Referring to FIG. 7B, the protrusion 714 of the core 710 inserted into the opening of the inductor sub-assembly 234 may have a shape to fill up the opening of the inductor sub-assembly 234. For example, a volume of the protrusion 714 of the core 710 may be less than or equal to that of the opening formed in the inductor sub-assembly 234. Referring to FIG. 7B, the protrusion 724 of the core 720 inserted into the opening of the inductor sub-assembly 232 may have a shape to fill up the opening of the inductor sub-assembly 232. For example, a volume of the protrusion 724 of the core 720 may be less than or equal to that of the opening formed in the inductor sub-assembly 232.

Referring to FIG. 7B, as one end of the protrusion 724 of the core 720 inserted into the opening of the inductor sub-assembly 232 is spaced apart from, and facing, one end of the protrusion 714 of the core 710 inserted into the opening of the inductor sub-assembly 234, an air gap 730 may be formed within the transformer 118-3. Referring to FIG. 7B, in order to form the air gap 730, a length of the protrusion 724 of the core 720 may be less than that of the tube portion of the inductor sub-assembly 232 having the opening for inserting the protrusion 724. Although an example is shown in which the air gap 730 is formed adjacent to the inductor sub-assembly 232 of the inductor sub-assemblies 232 and 234, the embodiment is not limited thereto, and the air gap 730 may be formed, for example, adjacent to the inductor sub-assembly 232 of the inductor sub-assemblies 232 and 234.

As described above, the transformer 118-3 included in the display device according to an example embodiment may include cores 710 and 720 having different shapes in order to provide increased leakage inductance to other circuits connected to the transformer 118-3. Referring to FIG. 7B, in the cores 710 and 720, the shapes of the protrusions 714 and 724 inserted into the openings of the inductor sub-assemblies 232, 234, 236 and 238 may be different from each other. As the magnetic fluxes generated by the inductors included in each of the inductor sub-assemblies 232, 234, 236 and 238 are formed within the cores 710 and 720 having different shapes, the leakage inductance between the inductors arranged in the different protrusions 714 and 724 may increase. Hereinafter, an equivalent circuit of the transformer 118-3 including the cores 710 and 720 having different shapes will be described with reference to FIG. 8.

Figure 8:
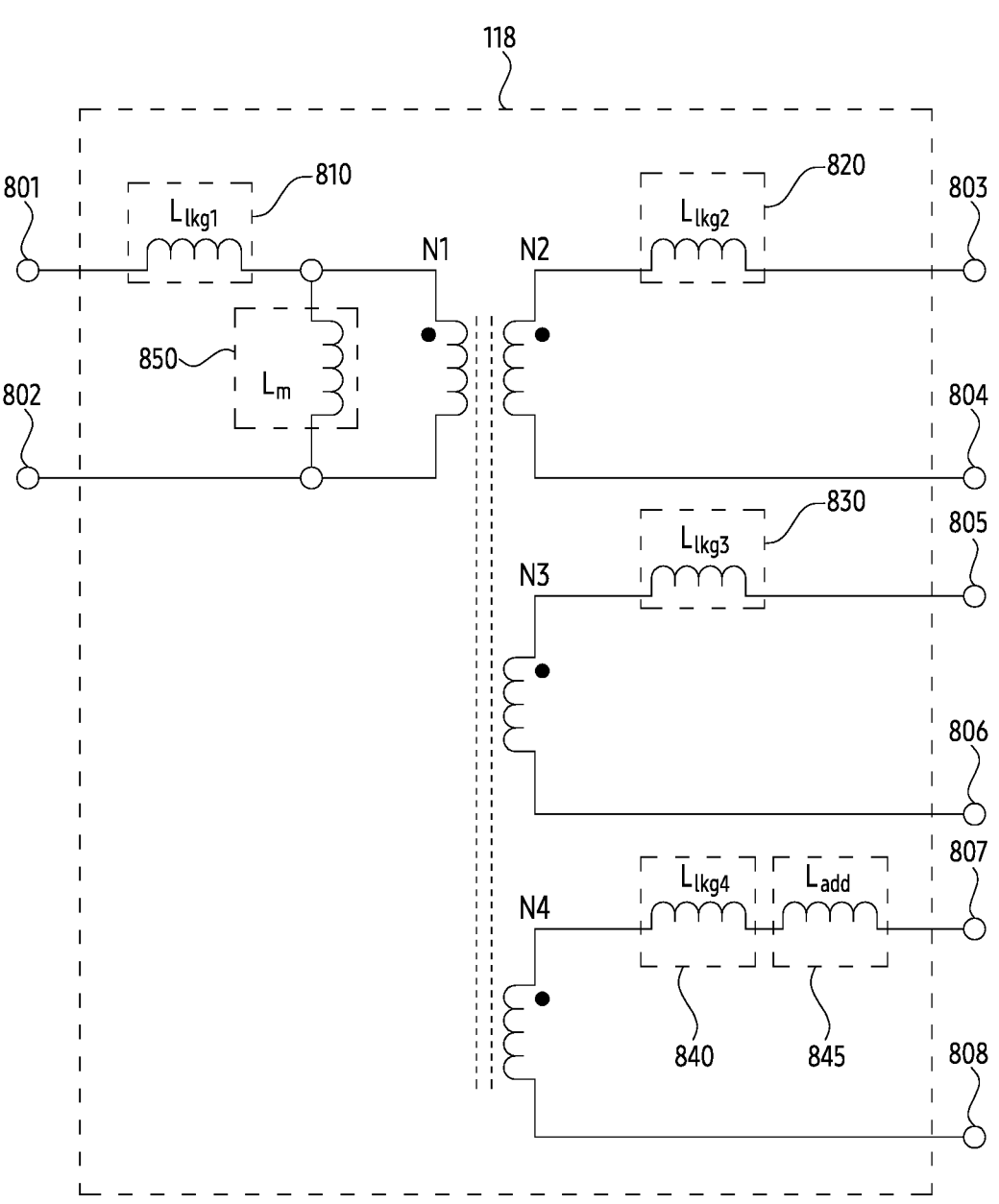
FIG. 8 is a circuit diagram illustrating an equivalent circuit of a transformer included in a display device according to an exemplary embodiment.

FIG. 8 is a diagram illustrating an equivalent circuit of a transformer 118 included in a display device according to an exemplary embodiment. The display device of FIG. 8 may correspond to the display device 101 of FIG. 1. The transformer 118 of FIG. 8 may correspond to the transformer 118 of FIG. 1. For example, the equivalent circuit of FIG. 8 may correspond to the equivalent circuit to the transformer 118-1 of FIGS. 2A, 2B and 5, the transformer 118-2 of FIG. 6A, and the transformer 118-3 of FIGS. 7A and 7B.

Referring to FIG. 8, it is shown an equivalent circuit between terminals 801, 802, 803, 804, 805, 806, 807 and 808 connected to inductors included in the inductor sub-assemblies included in the transformer 118 (e.g., the inductor assembly 230 of FIG. 2). For example, the terminals 801 and 802 may correspond to both opposite ends of the inductor included in the inductor sub-assembly 232 of FIGS. 2A, 5, 6A, 7A and 7B. In the equivalent circuit, between the terminals 801 and 802 may be arranged a leakage inductor 810 having leakage inductance $L_{lkg1}$ corresponding to the inductor of the inductor sub-assembly 232 and a magnetization inductor 850 having magnetization inductance $L_m$ corresponding to the inductor of the inductor sub-assembly 232. For example, the terminals 803 and 804 may correspond to both opposite ends of the inductor included in the inductor sub-assembly 236 of FIGS. 2A, 5, 6A, 7A and 7B. In the equivalent circuit, between the terminals 803 and 804 may be disposed a leakage inductor 820 having leakage inductance $L_{lkg2}$ corresponding to the inductor of the inductor sub-assembly 236. For example, the terminals 805 and 806 may correspond to both opposite ends of the inductor included in the inductor sub-assembly 238 of FIGS. 2A, 5, 6A, 7A and 7B. In the equivalent circuit, between terminals 805 and 806 may be disposed a leakage inductor 830 having leakage inductance $L_{lkg3}$ corresponding to the inductor of the inductor sub-assembly 238. For example, the terminals 807 and 808 may correspond to both opposite ends of the inductor included in the inductor sub-assembly 234 of FIGS. 2A, 5, 6A, 7A and 7B. In the equivalent circuit, between the terminals 807 and 808 may be disposed a leakage inductor 840 having leakage inductance $L_{lkg4}$ corresponding to the inductor of the inductor sub-assembly 234 and a leakage inductor 845 having leakage inductance $L_{add}$. The inductors in a plurality of inductor sub-assemblies may be inductively coupled to each other based on subtractive polarity.

As described above, in the transformer 118 according to an example embodiment, a first cross-sectional area of the protrusion of the core, around which the first inductor sub-assembly is wound, among a plurality of inductor sub-assemblies, may be different from a second cross-sectional area of the protrusion of the core around which other inductor sub-assemblies distinct from the first inductor sub-assembly are wound. Based on a difference between the first cross-sectional area and the second cross-sectional area, relatively large leakage inductance may be generated in the first inductor assembly. In the examples of FIGS. 2A, 5, 6A, 7A and 7B, the inductor sub-assembly 234 may correspond to the first inductor assembly, and the inductor sub-assembly 232, 236 and 238, distinct from the inductor sub-assembly 234, may correspond to the other inductor assemblies. Referring to FIG. 8, the leakage inductors 840 and 845 disposed between the terminals 807 and 808 corresponding to the inductor of the inductor sub-assembly 234 of FIGS. 2A, 5, 6A, 7A and 7B may indicate relatively large leakage inductance generated in the first inductor sub-assembly. For example, the leakage inductance $L_{add}$ of the leakage inductor 845 may be related to the difference between the first cross-sectional area and the second cross-sectional area. For example, the leakage inductance $L_{lkg4}$ of the leakage inductor 840 may be related to the positional relation between the inductor sub-assembly 234 in the above examples and another inductor sub-assembly (e.g., the inductor sub-assembly 232 in the above examples).

In the embodiment of FIG. 8, it is assumed that for the inductors included in the transformer 118, the number of turns N2 of the inductor corresponding to the terminals 803 and 804, the number of turns N3 of the inductor corresponding to the terminals 805 and 806, and the number of turns N4 of the inductor corresponding to the terminals 807 and 808 corresponds to each other. In the above assumption, the leakage inductances between the leakage inductors 820, 830, 840 and 845 may have a relationship of $L_{lkg2} \approx L_{lkg3} < L_{lkg4} + L_{add}$.

As described above, in the core of the transformer 118 according to an example embodiment, the thickness of a portion of the core around which the inductor assemblies are wound is distinguished for each inductor sub-assembly, so that the leakage inductors 840 and 845 having relatively large leakage inductance may be included in the equivalent circuit of the transformer 118. The leakage inductors 840 and 845 may be connected to another circuit distinct from the transformer 118 through the terminals 807 and 808 to provide inductance to the other circuit. By providing such inductance, the other circuit can be implemented with a relatively lower number of inductors.

Figure 9A:
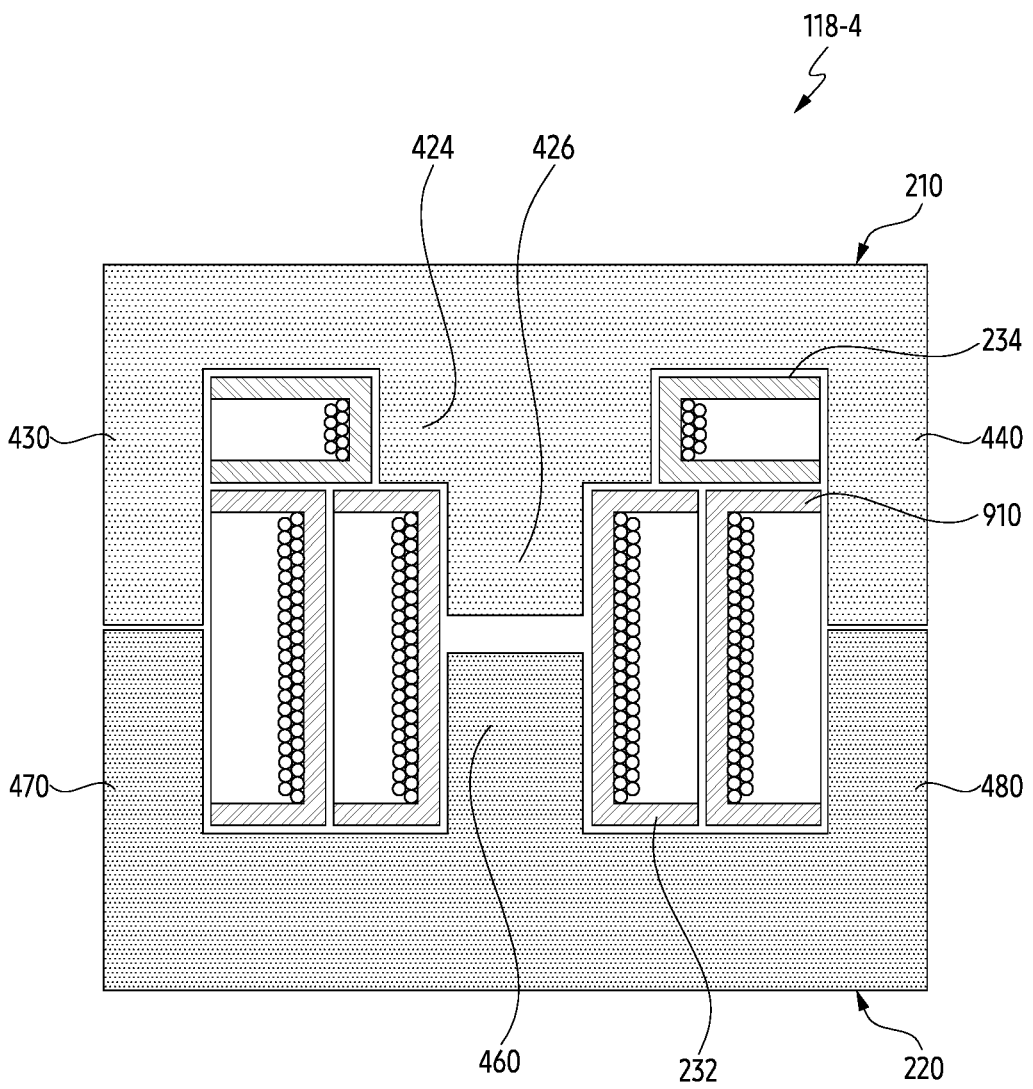
FIGS. 9A and 9B are diagrams illustrating an example of a transformer included in a display device according to an exemplary embodiment.
Figure 9B:
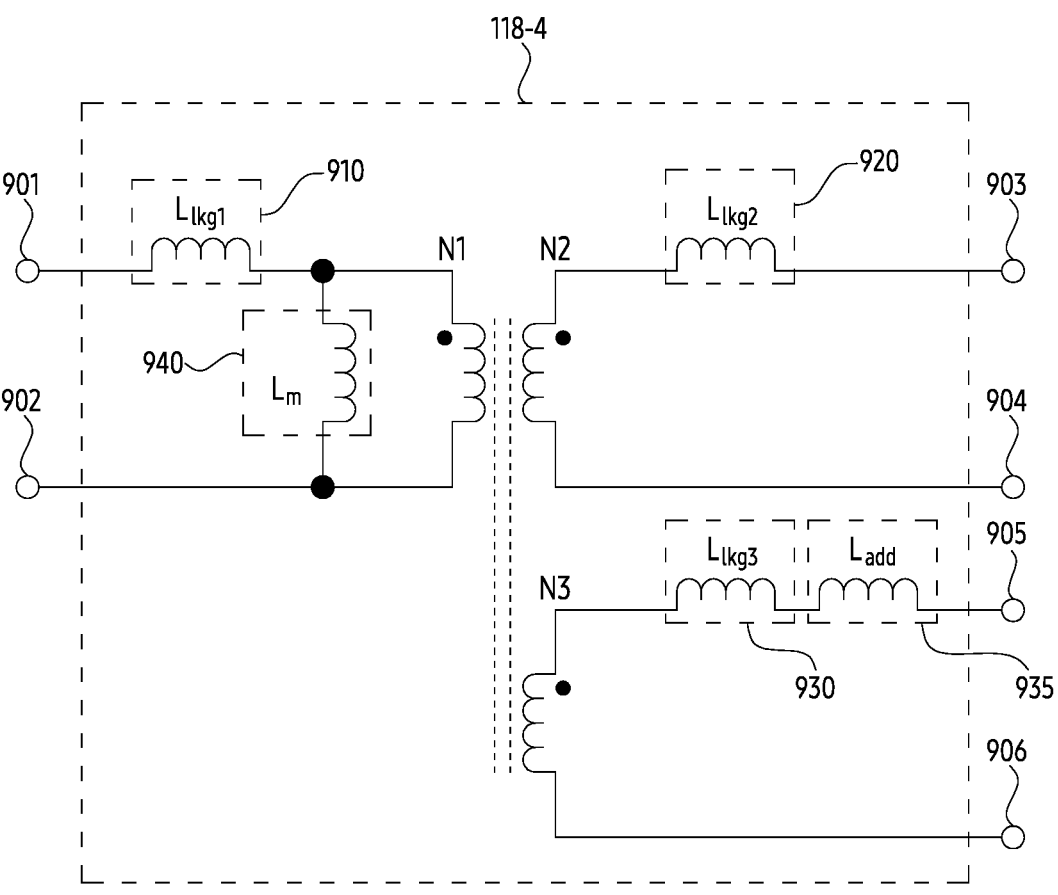

FIGS. 9A and 9B are diagrams illustrating an example of a transformer 118-4 included in a display device according to an exemplary embodiment. The display device of FIGS. 9A and 9B may correspond to the display device 101 of FIG. 1. The transformer 118-4 of FIGS. 9A and 9B may correspond to an example of the transformer 118 of FIG. 1.

FIG. 9A is a cross-sectional view of the transformer 118-4 included in the display device according to an exemplary embodiment. The transformer 118-4 according to an example embodiment may include cores 210 and 220 and inductor sub-assemblies 232, 234 and 910. The cores 210 and 220 may correspond to the cores 210 and 220 of FIGS. 2A, 2B, 4A and 4B. The inductor sub-assemblies 232 and 234 may correspond to the inductor sub-assemblies 232 and 234 of FIGS. 2A and 2B. Hereinafter, in describing the inductor sub-assemblies 232 and 234, and the cores 210 and 220, the description overlapping those of FIGS. 2A, 2B, 3, 4A, 4B and 5 will be omitted.

Referring to FIG. 9A, the transformer 118-4 according to an example embodiment may include an inductor assembly 910 including a tube portion with an opening corresponding to an outer circumference of the inductor sub-assembly 232. For example, the inductor sub-assembly 232 may be inserted into an opening of the inductor sub-assembly 910. A length of the tube portion may correspond to that of the tube portion of the inductor sub-assembly 232. The inductor assembly 910 may further include one or more flanges extending vertically from the tube portion. Referring to FIG. 9A, dimensions of the flanges may correspond to a distance between an outer circumference of the inductor sub-assembly 232 and protrusions 470 and 480 of the core 220, so that the inductor assembly 910 is fixed by the protrusions 470 and 480 of the core 220 and/or the inductor sub-assembly 232.

Referring to FIG. 9B, an equivalent circuit of the transformer 118-4 of FIG. 9A is shown. Referring to FIG. 9B, the equivalent circuit is shown between terminals 901, 902, 903, 904, 905 and 906 connected to the inductors included in the inductor sub-assemblies 232, 234 and 910 in transformer 118-4 of FIG. 9A. For example, the terminals 901 and 902 may correspond to both opposite ends of the inductor included in the inductor sub-assembly 232 of FIG. 9A. In the equivalent circuit, between the terminals 901 and 902 may be disposed a leakage inductor 910 having leakage inductance $L_{lkg1}$ related to the inductor of inductor sub-assembly 232 and a magnetization inductor 940 having magnetization inductance $L_m$ related to the inductor of the inductor sub-assembly 232. For example, the terminals 903 and 904 may correspond to both opposite ends of the inductor included in the inductor sub-assembly 910 of FIG. 9A. In the equivalent circuit, between terminals 903 and 904 may be disposed a leakage inductor 920 having leakage inductance $L_{lkg2}$ associated with the inductor of the inductor sub-assembly 910. For example, the terminals 905 and 906 may correspond to both opposite ends of the inductor included in the inductor sub-assembly 234 of FIG. 9A. In the equivalent circuit, between terminals 905 and 906 may be disposed a leakage inductor 930 having leakage inductance $L_{lkg3}$ associated with the inductor of the inductor sub-assembly 234 and a leakage inductor 935 having leakage inductance $L_{add}$. In the equivalent circuit, the inductors corresponding to each of the inductor sub-assemblies may be inductively coupled to each other based on subtractive polarity.

Referring to FIGS. 9A and 9B, the inductor of the inductor sub-assembly 234 corresponding to the leakage inductors 930 and 935 disposed between the terminals 905 and 906 may be wound around another portion of the core (e.g., the portion 424 of the core 210) having the shape different from a portion/portions of the core (e.g., the portion 426 of the core 210 and/or the section 460 of the core 220) around which the inductors of other inductor assemblies 232 and 910 are wound within the transformer 118-4. In this instance, based on the positional relation between the inductor sub-assembly 234 and the other inductor sub-assemblies 232 and 910, and the shape of the other portion of the core around which the inductor sub-assembly 234 is wound, the leakage inductors 930 and 935 may have inductance different from the leakage inductor 920. For example, the leakage inductance $L_{add}$ of the leakage inductor 935 may be based at least on the shape of the other portion of the core around which the inductor sub-assembly 234 is wound. For example, the leakage inductance $L_{lkg4}$ of the leakage inductor 930 may be based at least on the positional relation between the inductor sub-assembly 234 and the other inductor sub-assemblies 232 and 910. For example, the leakage inductances of each of the leakage inductors 920, 930 and 935 may have a relationship of $L_{lkg2} < L_{lkg3} + L_{add}$.

Hereinafter, an example of a display device including a transformer will be described in greater detail below with further reference to FIGS. 10, 11, and 12A, 12B, 12C and 12D.

Figure 10:
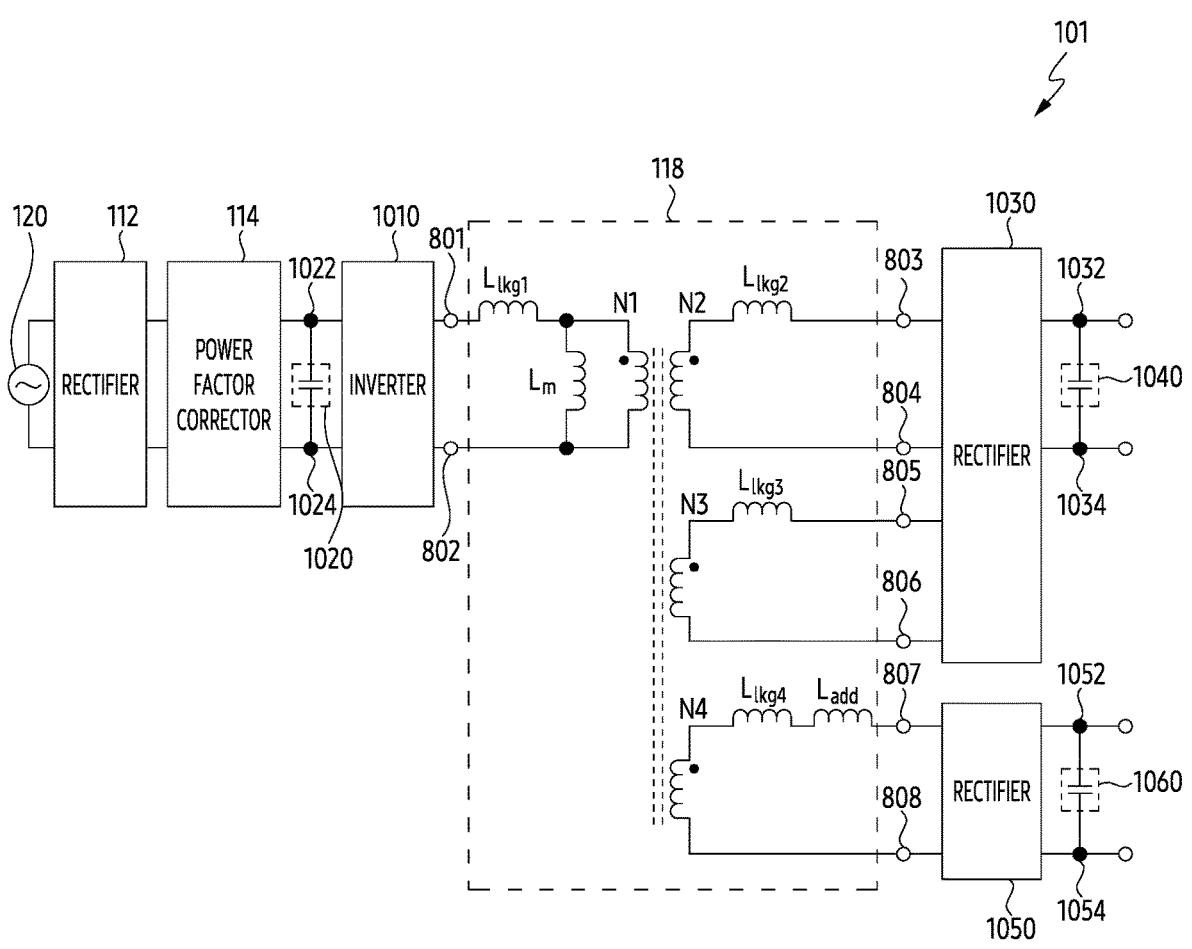
FIG. 10 is a circuit block diagram illustrating an example operation of a transformer included in a display device according to an exemplary embodiment.

FIG. 10 is a block and equivalent circuit diagram illustrating the operation of a transformer 118 included in a display device 101 according to an exemplary embodiment. The display device 101 of FIG. 10 may correspond to the display device 101 of FIG. 1. For example, a power source 120, a rectifier 112, a power factor corrector 114, and the transformer 118 of FIG. 10 may correspond to the power source 120, the rectifier 112, the power factor corrector 114, and the transformer 118 of FIG. 1, respectively. For example, the transformer 118 of FIG. 10 may include the transformer 118-1 of FIGS. 2A, 2B and 5, the transformer 118-2 of FIG. 6A, and the transformer 118-3 of FIGS. 7A and 7B. Referring then to FIG. 10, the equivalent circuit of the transformer 118 may correspond to the equivalent circuit of FIG. 8.

Referring to FIG. 10, an AC signal received from the power source 120 may be rectified by the rectifier 112 included in the display device 101. The power factor corrector 114 receiving the rectified AC signal may transmit a current to a capacitor 1020 included in the display device 101, based on at least a phase of the voltage of the rectified AC signal. The capacitor 1020 may be coupled to the power factor corrector 114 via nodes 1022 and 1024.

Figure 11:
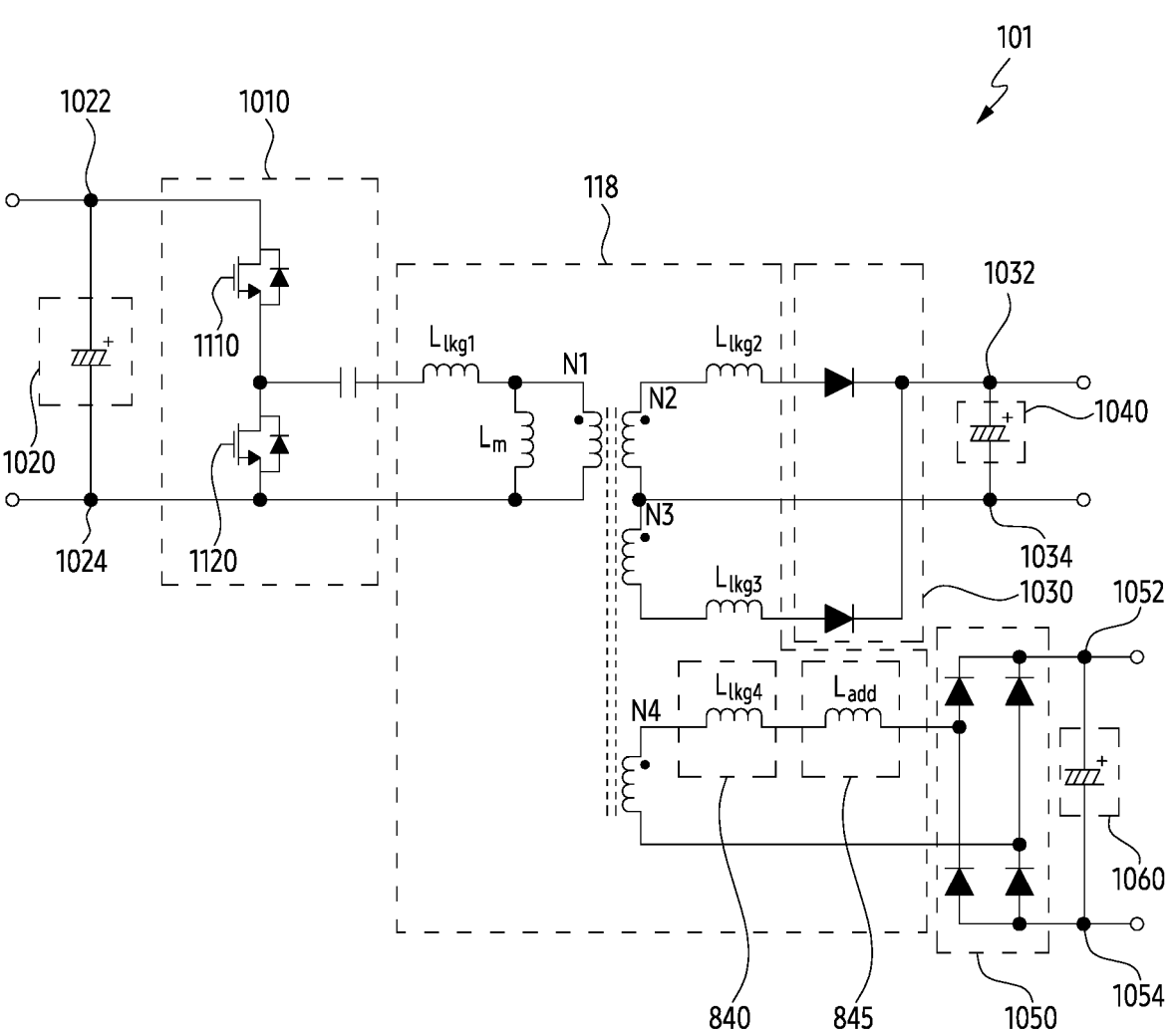
FIG. 11 is a circuit diagram illustrating an example operation of a transformer included in a display device according to an exemplary embodiment.

Referring to FIG. 10, the display device 101 according to an example embodiment may include an inverter 1010 to generate an AC signal having a cycle and/or a phase independent of the AC signal from the power source 120, from the power charged in the capacitor 1020. The inverter 1010 may include, for example, a half-bridge inverter and/or a full-bridge inverter. Examples of the inverter 1010 are shown in FIG. 11 and/or FIGS. 12A to 12D.

Referring to FIG. 10, the AC signal generated by the inverter 1010 may be input to the transformer 118 through terminals 801 and 802. In a state that the AC signal is input to the transformer 118 through the terminals 801 and 802, AC signals having a voltage at least based on a ratio of the numbers of turns N1, N2, N3 and N4 of each of the inductors included in a plurality of inductor sub-assemblies may be output through the terminals 803, 804, 805, 806, 807 and 808. As the plurality of inductor sub-assemblies included in the transformer 118 are inductively coupled based on a plurality of cores having different shapes, the leakage inductances $L_{lkg1}$, $L_{lkg2}$, $L_{lkg3}$, $L_{lkg4}$ and $L_{add}$ and the magnetization inductance $L_m$ may be formed in the transformer 118. A voltage of the AC signals output through the terminals 803, 804, 805, 806, 807 and 808 may be determined by the leakage inductance and/or the magnetization inductance.

Referring to FIG. 10, it is shown an example of a power circuit (e.g., the power circuit 110 of FIG. 1) of the display device 101 according to an example embodiment, which supports multiple outputs based on the transformer 118. For example, the voltage of the AC signal output through the terminals 803 and 804, the voltage of the AC signal output through the terminals 805 and 806, and the voltage of the AC signal output through the terminals 807 and 808 may be independent of each other. As the terminals 803, 804, 805, 806, 807 and 808 are connected to different circuits of the display device 101, the AC signals of different voltages may be input to the different circuits. For example, the power circuit of the display device 101 may include an isolation-type of converter based on the transformer 118.

Referring to FIG. 10, the rectifier 1030 connected to the terminals 803, 804, 805 and 806 may rectify the AC signals output from the terminals 803, 804, 805 and 806. The AC signal rectified by the rectifier 1030 may be used to charge the capacitor 1040 connected to the terminals 1032 and 1034 of the rectifier 1030. The power charged in the capacitor 1040 may be used to drive another circuit (e.g., the second circuit 140 of FIG. 1) connected via the terminals 1032 and 1034. Among the leakage inductances formed in transformer 118, the leakage inductances $L_{lkg2}$ and $L_{lkg3}$ may be supplied to the rectifier 1030 and/or other circuitry coupled to the terminals 1032, 1034.

Referring to FIG. 10, the rectifier 1050 connected to the terminals 807 and 808 may rectify AC signals output from the terminals 807 and 808. The AC signal rectified by the rectifier 1050 may be used to charge the capacitor 1060 connected to the terminals 1052 and 1054 of the rectifier 1050. The power charged in the capacitor 1060 may be used to drive another circuitry connected via the terminals 1052 and 1054 (e.g., the first circuit 130 including an LED driving circuit of FIG. 1). The leakage inductances $L_{lkg4}$ and $L_{add}$ of the leakage inductances formed in the transformer 118 may be supplied to the rectifier 1050 and/or other circuitry coupled to the terminals 1052 and 1054. For example, the leakage inductance $L_{lkg4}$ and/or the leakage inductance $L_{add}$ in rectifier 1050 may be used to obtain a voltage exceeding the voltage applied to the terminals 807 and 808.

Hereinafter, referring then to FIGS. 11 and/or 12A, 12B, 12C and 12D, an example of the inverter 1010 and the rectifiers 1030 and 1050 each connected to the terminals 803, 804, 805, 806, 807 and 808 of the transformer 118 are described.

FIG. 11 is a circuit diagram illustrating an example operation of the transformer 118 included in the display device 101 according to an exemplary embodiment. The display device 101 of FIG. 11 may correspond to the display device 101 of FIG. 1. The circuit diagram of FIG. 11 may correspond to an example of the display device 101 of FIG. 10.

Referring now to FIG. 11, the inverter 1010 of the display device 101 according to an example embodiment may operate based on a half-bridge scheme. For example, as each of pulse signals having a specified phase difference is input to gates 1110 and 1120 of two transistors included in the inverter 1010, an AC signal may be generated based on the voltage charged in the capacitor 1020. Referring to FIG. 11, an AC signal generated by the inverter 1010 may be input to the transformer 118. As the AC signal is input thereto, the transformer 118 may output a plurality of AC signals based on the input AC signal and having a voltage changed by the inductor sub-assemblies included in the transformer 118.

Referring to FIG. 11, a rectifier circuit based on a center-tap is illustrated as an example of the rectifier 1030 to rectify the AC signal output from the transformer 118. In this instance, in order to reduce the difference in current flowing through each of the diodes included in the rectifier 1030, the numbers of turns (e.g., N2, N3, etc.) of the inductors included in each of the inductor sub-assemblies connected to the rectifier 1030 (e.g., the inductor sub-assemblies 236 and 238 of FIG. 2A) may correspond to each other. As the numbers of turns of the inductors coincide with each other, the leakage inductances $L_{lkg2}$ and $L_{lkg3}$ of the transformer 118 related to the rectifier 1030 may coincide with each other. The capacitor 1040 connected to the terminals 1032 and 1034 connected to the rectifier 1030 may supply power to another circuitry connected subsequently to the terminals 1032, 1034 (e.g., the second circuit 140 in FIG. 1).

Referring to FIG. 11, a rectifier circuit based on a bridge diode is illustrated as an example of a rectifier 1050 that is distinct from the rectifier 1030. Full-wave rectification based on the bridge diode may be performed by the rectifier 1050. The capacitor 1060 coupled to the terminals 1052 and 1054 of the rectifier 1050 may be charged based on the current in the leakage inductors 840 and 845 coupled to the rectifier 1050. The power charged in the capacitor 1060 may be supplied to another circuit (e.g., the first circuit 130 of FIG. 1) connected to the terminals 1052 and 1054. As the transformer 118 according to an example embodiment provides the leakage inductors 840 and 845 having increased leakage inductances $L_{lkg4}$ and/or $L_{add}$, the voltage at least based on the increased leakage inductances $L_{lkg4}$ and/or $L_{add}$ may be input to the capacitor 1060. In such a case, the voltage required for the other circuit can be generated without adding any additional inductor for increasing a voltage.

Hereinafter, examples of utilizing the leakage inductances $L_{lkg4}$ and/or $L_{add}$ supplied from the transformer 118 will be described in greater detail below with reference to FIGS. 12A, 12B, 12C and 12D.

FIGS. 12A, 12B, 12C and 12D are circuit diagrams illustrating example operation of a transformer included in a display device according to an exemplary embodiment. The display device 101 of FIGS. 12A to 12D may correspond to the display device 101 of FIG. 1. The circuit diagrams of FIGS. 12A to 12D may correspond to an example of the display device 101 of FIG. 10.

Figure 12A:
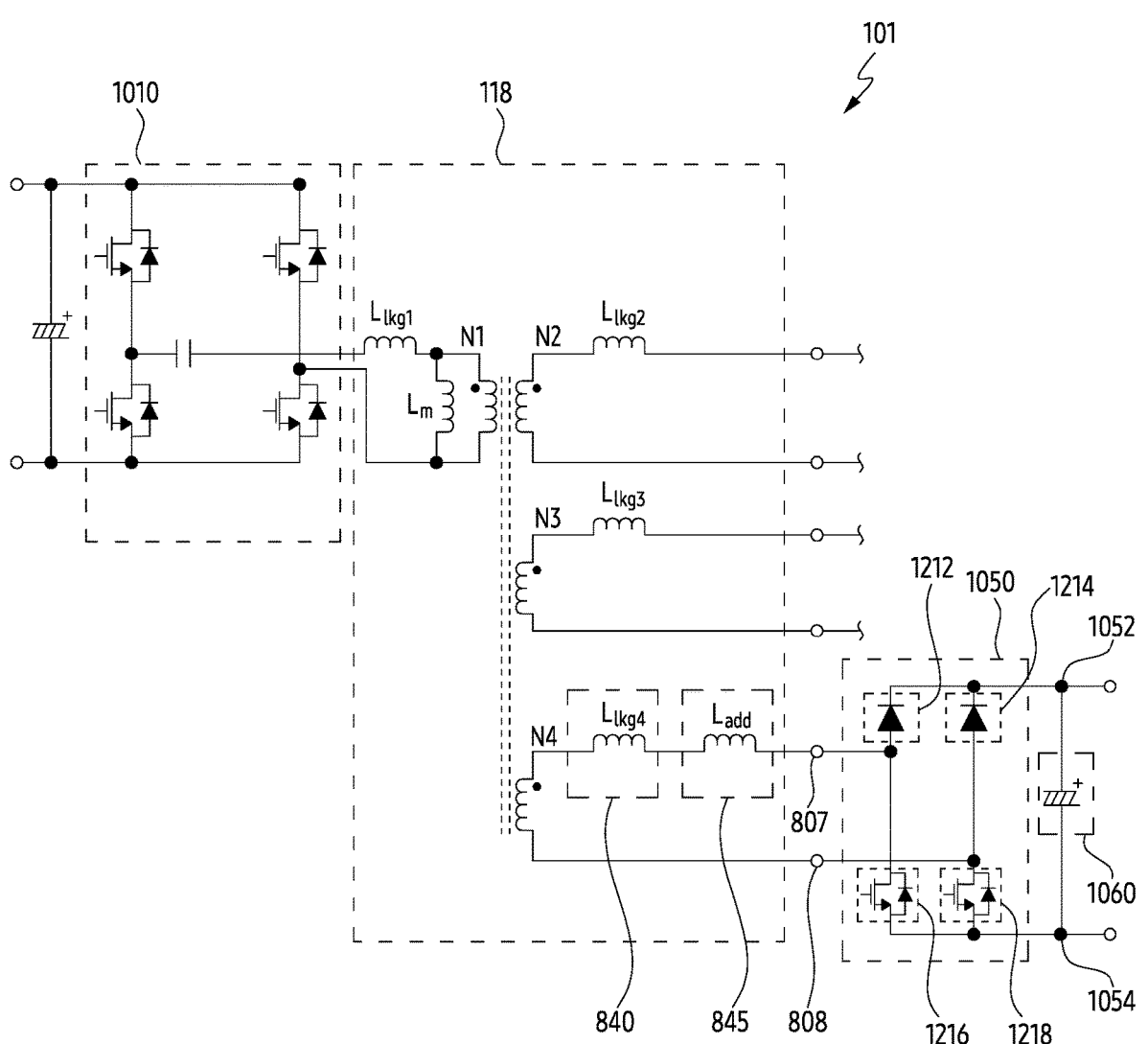
FIGS. 12A, 12B, 12C and 12D are circuit diagrams illustrating an example operation of a transformer included in a display device according to an exemplary embodiment.

Referring to FIG. 12A, the inverter 1010 of the display device 101 according to an example embodiment may operate based on a full bridge scheme. For example, in a state that a plurality of transistors included in the inverter 1010 operate based on pulse signals having a specified phase difference, the inverter 1010 may generate an AC signal to be input to the transformer 118. As the AC signal is input to the transformer 118, the transformer 118 may output a plurality of AC signals based on the input AC signal and having a voltage changed by the inductor sub-assemblies in the transformer 118.

Referring to FIG. 12A, a rectifier circuit based on a secondary side post regulator (SSPR) boost scheme is illustrated as an example of the rectifier 1050 to receive the AC signal output from the transformer 118. For example, as a synchronized pulse signal is applied to transistors 1216 and 1218 in the rectifier 1050, an AC signal output from the terminals 807 and 808 may be transmitted to the capacitor 1060 via at least one of diodes 1212 and 1214.

As described above, as the transformer 118 according to an embodiment supplies the leakage inductances $L_{lkg4}$ and/or $L_{add}$ based on the leakage inductors 840 and 845, the rectifier 1050 may receive an AC signal having an increased voltage based on the leakage inductors 840 and 845, without including an extra inductor for increasing a voltage.

Figure 12B:
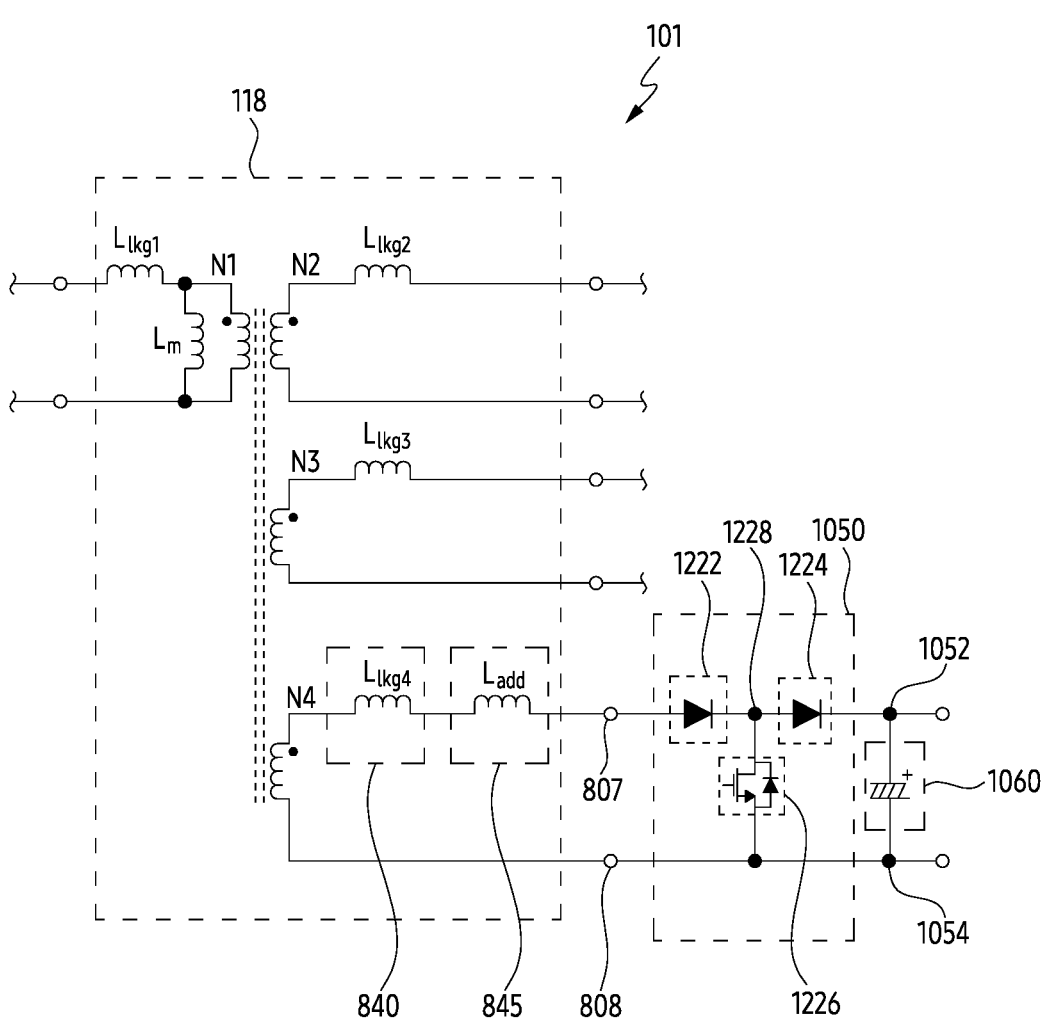

FIG. 12B illustrates another example of the rectifier 1050 receiving the AC signal output from the transformer 118, operating based on the SSPR boost scheme. The rectifier 1050 may include a transistor 1226 and diodes 1222 and 1224 coupled via a node 1228. As the transistor 1226 operates based on a pulse signal, an AC signal applied to the terminals 807 and 808 may be transmitted to the capacitor 1060 based on the pulse signal. As the transformer 118 according to an embodiment supplies the leakage inductances $L_{lkg4}$ and/or $L_{add}$ based on the leakage inductors 840 and 845, the rectifier 1050 may charge the capacitor 1060 based on a voltage increased by the leakage inductors 840 and 845, without including any extra inductor for increasing a voltage. The charged capacitor 1060 may output a power signal having the increased voltage to another circuit connected via the terminals 1052 and 1054.

Figure 12C:
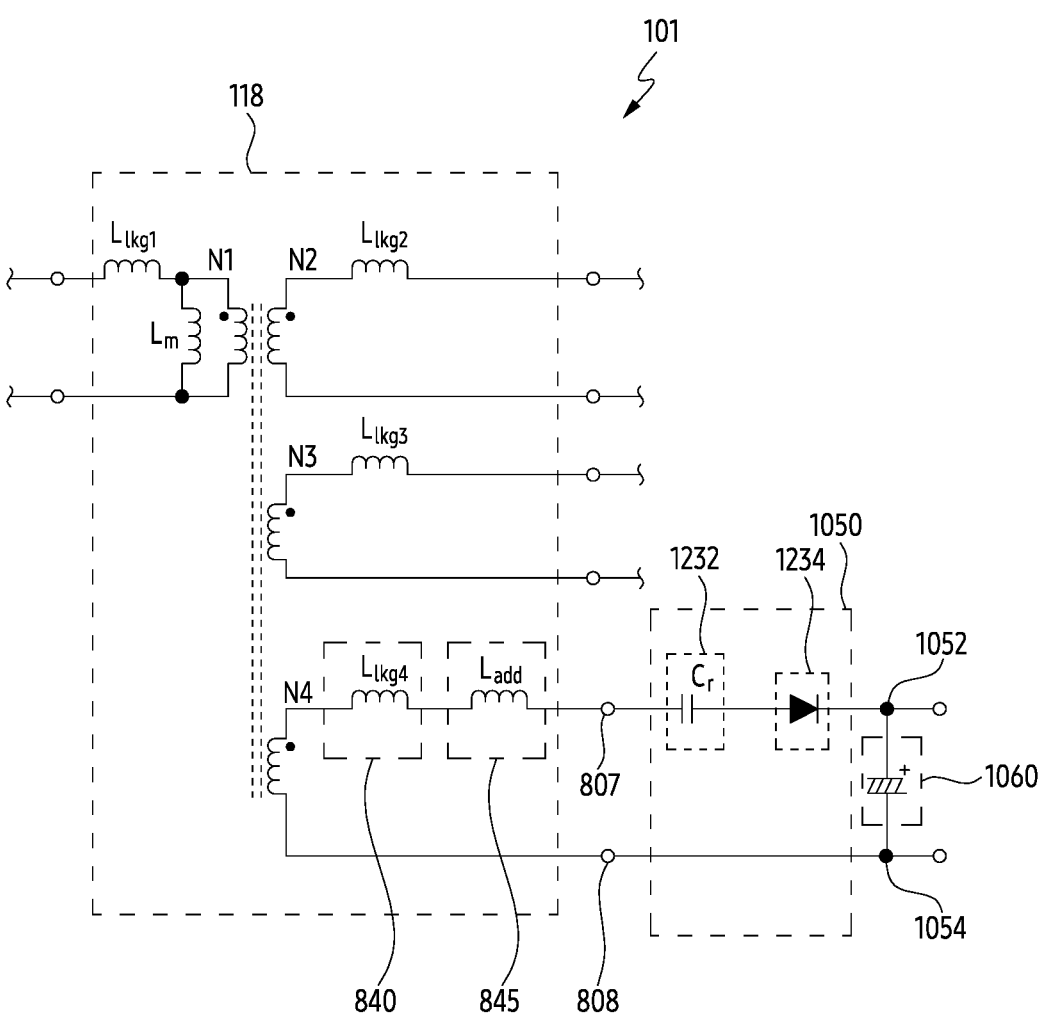
Figure 12D:
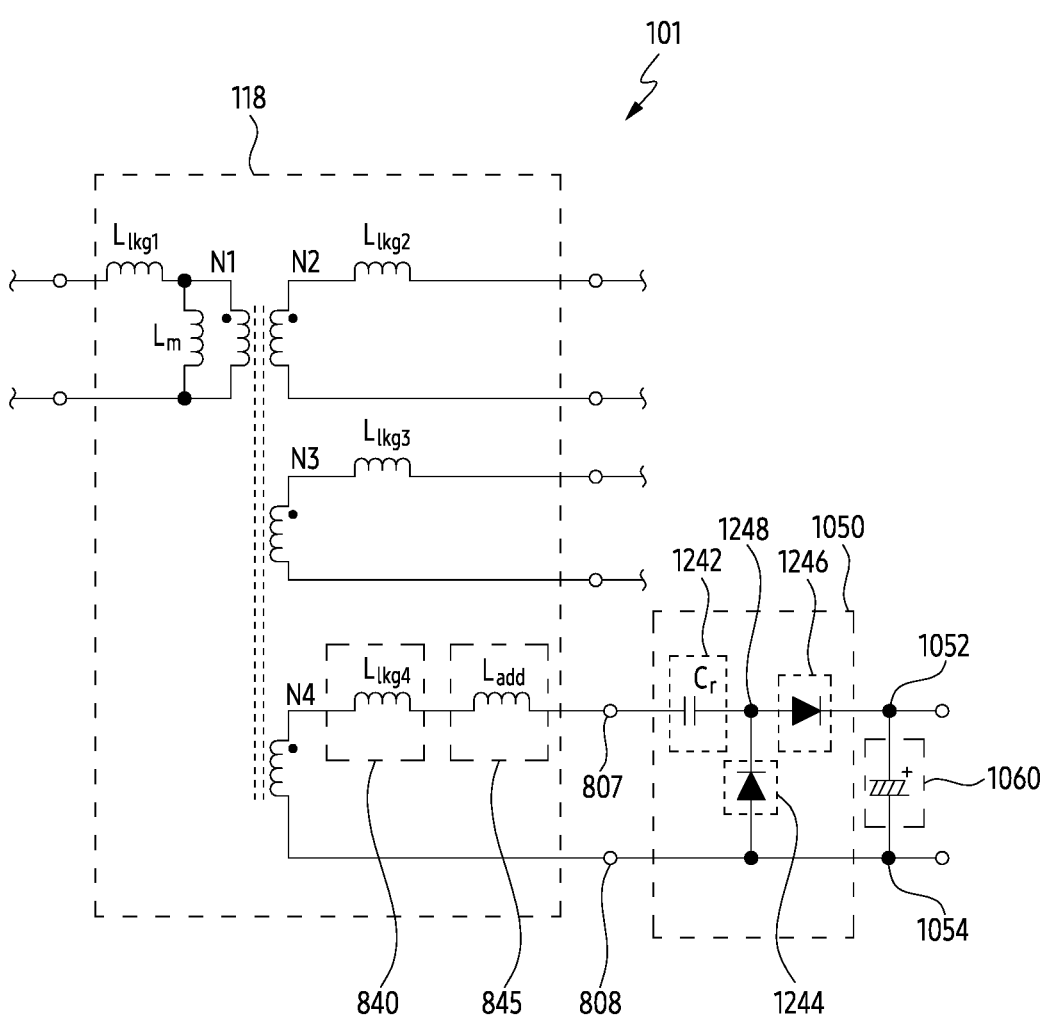

FIGS. 12C and 12D are diagrams illustrating examples in which the rectifier 1050 receiving the AC signal output from the transformer 118 operates based on a secondary resonance scheme. Referring now to FIGS. 12C and 12D, the leakage inductors 840 and 845 and the capacitor (e.g., the capacitors 1232 and 1242) may be connected in series via the terminal 807 of those terminals 807 and 808. Referring to FIG. 12C, the rectifier 1050 is a device distinct from the inductor, and it may include a capacitor 1232 and a diode 1234. Referring then to FIG. 12D, the rectifier 1050 is a device distinct from the inductor, and may include a capacitor 1242 and diodes 1244 and 1246 connected via a node 1248. The rectifier 1050 of FIGS. 12C and 12D may include a capacitor among an inductor and/or a capacitor. As the transformer 118 included in the display device 101 according to an example embodiment provides the leakage inductances Llkg4 and/or Ladd based on the leakage inductors 840 and 845, the rectifier 1050 having no inductor may increase the voltage between the terminals 1052 and 1054, to which capacitor 1060 is connected, based on the secondary resonance between the leakage inductors 840 and 845, and the capacitors (e.g., capacitors 1232 and 1242 in FIGS. 12C and 12D).

As described above, the inverter 1010 of FIG. 10 may selectively include the inverter 1010 of FIG. 11 or the inverter 1010 of FIG. 12A. The embodiments are not limited to a combination of the inverter 1010 and the rectifiers 1030 and 1050 as seen in FIGS. 11 and 12A to 12D, and the transformer 118 according to the example embodiment may be connected to the inverter 1010 and the rectifiers 1030 and 1050 of another combination distinct from the combination of FIGS. 11 and 12A to 12D. For example, the rectifier 1050 of FIG. 10 may optionally include the rectifier 1050 of FIG. 11 or different rectifiers 1050 of FIGS. 12A to 12D.

In an embodiment, in a state that a full-bridge type of inverter 1010 of FIG. 12A is connected to the transformer 118, a full-bridge type of rectifier 1050 and the rectifier 1030 based on a middle tap in FIG. 11 may be connected to the transformer 118.

Figure 13A:
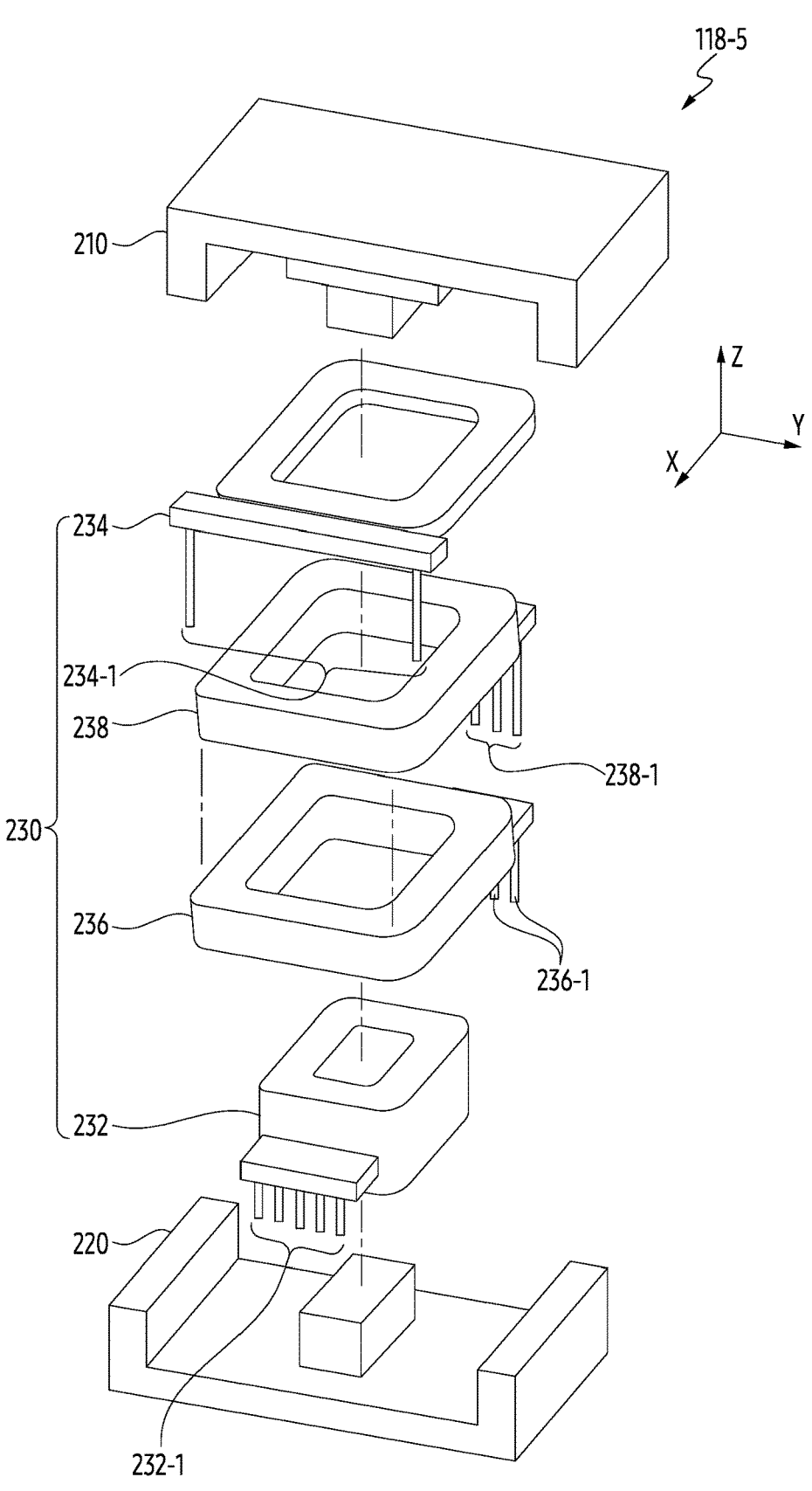
FIGS. 13A and 13B are diagrams illustrating an example of a transformer included in a display device according to an exemplary embodiment.
Figure 13B:
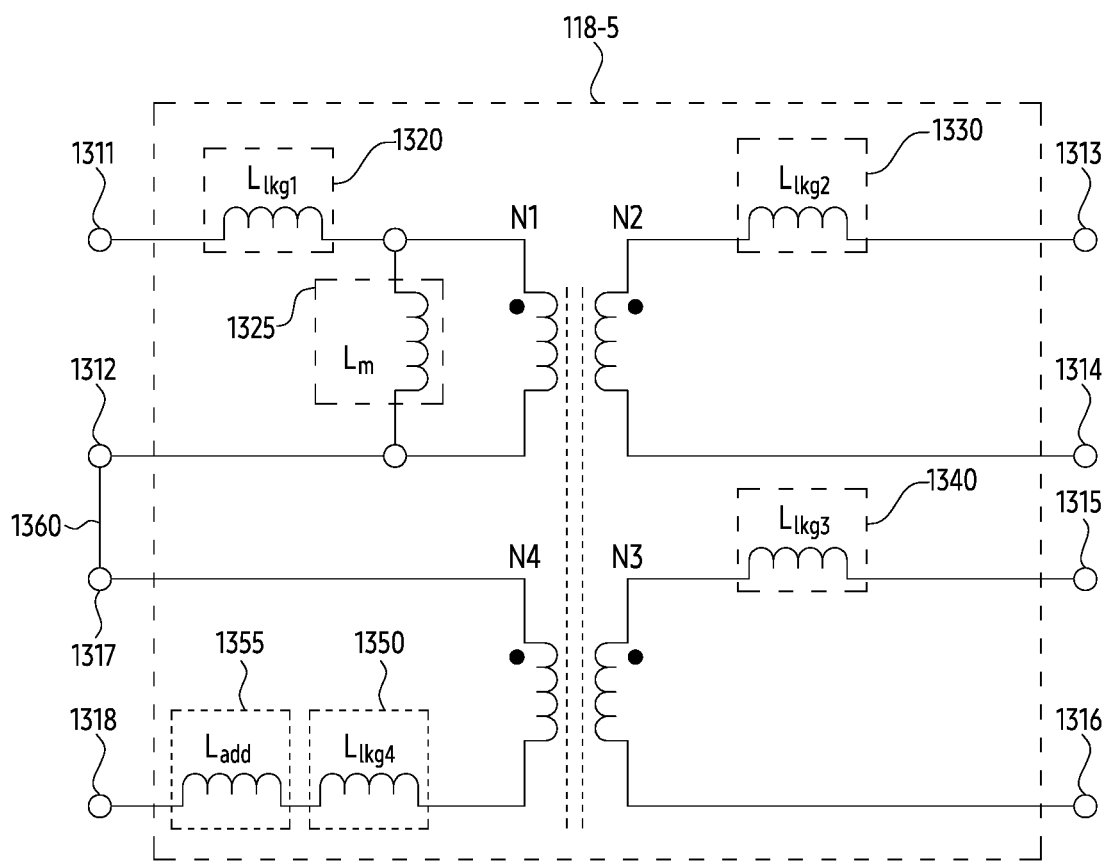

FIGS. 13A and 13B are diagrams illustrating an example of a transformer 118-5 included in a display device according to an exemplary embodiment. The display device of FIGS. 13A and 13B may correspond to the display device 101 of FIG. 1. The transformers 118-5 of FIGS. 13A and 13B may correspond to an example of the transformer 118 of FIG. 1.

FIG. 13A is an exploded perspective view of the transformer 118-5 included in the display device according to an example embodiment. The transformer 118-5 according to an example embodiment may include the cores 210 and 220 and the inductor assembly 230 disposed between the cores 210 and 220. Referring to FIG. 13A, there are shown the inductor sub-assemblies 232, 234, 236 and 238 included within transformer 118-5. In describing the cores 210 and 220 and the inductor assembly 230, the description overlapping the corresponding portions of FIGS. 2A, 2B and 3 will be omitted for convenience sake.

The inductor sub-assemblies 232, 234, 236 and 238 may include openings into which protrusions of the cores 210 and 220 are inserted. Each of the inductor sub-assemblies 232, 234, 236 and 238 may include one or more pins corresponding to a portion extending to the outside of a conductive wire wound around a bobbin of the inductor sub-assembly. Referring to FIG. 13A, there are shown pins 232-1, 234-1, 236-1 and 238-1 included in each of the inductor sub-assemblies 232, 234, 236 and 238. In the embodiment of FIG. 13A, the direction which the pins 232-1 and 234-1 included in the inductor assemblies 232 and 234 face may be referred to as +x direction. The direction which the pins 232-1 and 234-1 face and the direction which the pins 236-1 and 238-1 face may be distinguished from each other. For example, the direction which the pins 236-1 and 238-1 included in the inductor sub-assemblies 236 and 238 face may be referred to as −x direction. The relation between the directions of the inductor sub-assemblies 232, 234, 236 and 238 indicated by these pins 232-1, 234-1, 236-1 and 238-1 may be distinguished from the relation between the directions of the inductor sub-assembly 232, 234, 236 and 238 of FIG. 2A. Hereinafter, with reference to FIG. 13B, description will be made of the equivalent circuit of the transformer 118-5 based on the relation of the directions of the inductor sub-assemblies 232, 234, 236 and 238, which is distinct from the relation between the directions of the inductor sub-assemblies 232, 234, 236 and 238 of FIG. 2A.

Referring to FIG. 13B, is an equivalent circuit of the transformer 118-5 of FIG. 13A. Referring to FIG. 13B, terminals 1311, 1312, 1313, 1314, 1315, 1316, 1317 and 1318 connected to the inductors included in the inductor sub-assemblies 232, 234, 236 and 238 in the transformer 118-5 of FIG. 13A. For example, the terminals 1311 and 1312 may correspond to both opposite ends of the inductor included in the inductor sub-assembly 232 of FIG. 13A. In the equivalent circuit, between the terminals 1311 and 1312 may be disposed a leakage inductor 1320 having leakage inductance $L_{lkg1}$ associated with the inductor of the inductor sub-assembly 232 and a magnetization inductor 1325 having a magnetization inductance $L_m$ associated with the inductor of the inductor sub-assembly 232. For example, the terminals 1313 and 1314 may correspond to both opposite ends of the inductor included in the inductor sub-assembly 236 of FIG. 13A. In the equivalent circuit, between these terminals 1313 and 1314 may be disposed a leakage inductor 1330 having a leakage inductance $L_{lkg2}$ associated with the inductor of inductor sub-assembly 236. For example, the terminals 1315 and 1316 may correspond to both opposite ends of then inductor included in the inductor sub-assembly 238 of FIG. 13A. In the equivalent circuit, between the terminals 1315 and 1316 may be disposed a leakage inductor 1340 having leakage inductance $L_{lkg3}$ associated with the inductor of the inductor sub-assembly 238. For example, the terminals 1317 and 1318 may correspond to both opposite ends of the inductor included in the inductor sub-assembly 234 of FIG. 13A. In the equivalent circuit, between the terminals 1317 and 1318 may be disposed a leakage inductor 1350 having leakage inductance $L_{lkg4}$ of the inductor sub-assembly 234 and a leakage inductor 1355 having leakage inductance $L_{add}$.

As the direction between the inductor sub-assemblies 232, 234, 236 and 238 of FIG. 13A is distinguished from the direction between the inductor sub-assemblies 232, 234, 236 and 238 of FIG. 2A, the transformer 118-5 of FIG. 13A may have an equivalent circuit distinct from the equivalent circuit of the transformer 118-1 of FIG. 2A. Referring to FIG. 13B, in a state that the terminals 1312 and 1317 are electrically connected by a conductive wire 1360, an inductor corresponding to the terminals 1311 and 1312 (e.g., the inductor of the inductor sub-assembly 232 of FIG. 13A) and an inductor corresponding to the terminals 1313 and 1314 (e.g., the inductor of the inductor sub-assembly 236 of FIG. 13A) may be inductively coupled, and an inductor corresponding to the terminals 1315 and 1316 (e.g., the inductor of the inductor sub-assembly 238 of FIG. 13A and an inductor corresponding to the terminals 1317 and 1318 (e.g., the inductor of the inductor sub-assembly 234 of FIG. 13A) may be inductively coupled. These inductors may be inductively coupled based on subtractive polarity.

Referring to FIG. 13A, since a cross-sectional area of a first portion of the protrusion of the core 210 in which the inductor sub-assembly 234 is different from a cross-sectional area of the protrusion of the core 220 and/or a second portion of the protrusion of the core 210 in which the inductor sub-assemblies 232, 236 and 238 are disposed, the leakage inductance associated with the inductor sub-assembly 234 may be larger than the leakage inductance associated with the inductor sub-assemblies 236 and 238. In the equivalent circuit of the transformer 118-5 of FIG. 13B, the leakage inductor 1355 with leakage inductance $L_{add}$, being related to the inductor sub-assembly 234 of FIG. 13A, may exhibit the leakage inductance greater than the leakage inductance of the inductor sub-assemblies 236 and 238.

With the terminals 1312 and 1317 being electrically connected via a conductive wire 1360, the leakage inductance $L_{add}$ indicated by the leakage inductor 1355 may be supplied to another circuitry connected to the terminals 1311 and 1318. When the transformer 118-5 corresponds to an example of the transformer 118 of FIG. 10, each of the terminals 801 and 802 of FIG. 10 may correspond to the terminals 1311 and 1318 of FIG. 13A. In this instance, an AC signal supplied from the inverter 1010 of FIG. 10 may be output to the inductor sub-assemblies of the transformer 118-5 (e.g., the inductor sub-assemblies 232 and 234 of FIG. 13A) disposed between the terminals 1311 and 1318. Referring to the equivalent circuit of the transformer 118-5 of FIG. 13B, owing to the inductive coupling between a first inductor corresponding to the terminals 1311 and 1312 (e.g., the inductor of the inductor sub-assembly 232 of FIG. 13A) and a second inductor corresponding to the terminals 1313 and 1314 (e.g., the inductor of inductor sub-assembly 236 of FIG. 13A), an AC signal supplied from the inverter 1010 of FIG. 10 to the first inductor may cause generation of an AC signal at the second inductor. Owing to the inductive coupling between a third inductor corresponding to terminals 1315 and 1316 (e.g., the inductor of inductor sub-assembly 238 of FIG. 13A) and a fourth inductor corresponding to terminals 1317, 1318 (e.g., the inductor sub-assembly 234 of FIG. 13A), an AC signal supplied from the inverter 1010 of FIG. 10 to the fourth inductor may cause generation of an AC signal at the third inductor. As the leakage inductance $L_{lkg4}$ and/or leakage inductance $L_{add}$ indicated by each of the leakage inductor 1350 and/or the leakage inductor 1355 are supplied to the inverter 1010, the number of inductors included in inverter 1010 can be reduced.

As described above, the display device according to an example embodiment can provide the power and the leakage inductance required for each of different circuits connected to a transformer, using the transformer including a plurality of inductor sub-assemblies. For example, a protrusion of a core included in the transformer may include a first portion having a first cross-sectional area inserted into an opening of a first inductor sub-assembly of the plurality of inductor sub-assemblies, and a second portion having a second cross-sectional area, different from the first cross-sectional area, being inserted into an opening of a second inductor sub-assembly of the plurality of inductor sub-assemblies. In the protrusion of the core, a coupling factor between the first inductor sub-assembly and the second inductor sub-assembly may be adjusted based on a difference between the first cross-sectional area of the first portion and the second cross-sectional area of the second portion. Based on the adjusted coupling factor, the transformer of the display device according to an example embodiment can provide other circuits connected to the transformer with the leakage inductance required by those other circuits.

As described above, a display device according to an example embodiment may comprise a transformer comprising a core including a first surface and a protrusion protruding from the first surface along a direction which the first surface faces. In the core, a cross-section of a first portion of the protrusion perpendicular to the direction has a first area, and a cross-section of a second portion of the protrusion between the first portion and the first surface has a second area larger than the first area. The transformer of the display device comprise a first inductor sub-assembly including a first bobbin including a first opening corresponding to the first area, in contact with an outer circumference of a first portion of the core, and an inductor wound around the first bobbin. The transformer of the display device comprise a second inductor sub-assembly including a second bobbin including a second opening corresponding to the second area, in contact with an outer circumference of a second portion of the core, and an inductor wound around in the second bobbin.

In a display device according to an example embodiment, the transformer may further comprise another core including a second surface facing and being spaced apart from the first surface of the core, and a protrusion protruding from the second surface along a direction which the second surface faces. A cross-section of the protrusion of the other core perpendicular to the direction which the second surface faces has the first area. The protrusion of the other core is inserted into the first opening of the first inductor sub-assembly, in contact with at least a portion of an inner circumference of the first inductor sub-assembly.

In a display device according to an example embodiment, the first bobbin of the first inductor sub-assembly may further include a tube portion wherein the inductor of the first inductor sub-assembly is wound around an outer circumference of the tube portion, and having an inner circumference corresponding to the first area of the first opening. A space between one end of the protrusion of the core inserted in the inner circumference of the tube portion and one end of the protrusion of the other core may form an air gap.

In a display device according to an example embodiment, the first bobbin of the first inductor sub-assembly may further include a flange extending from one end of the tube portion along a direction perpendicular to the tube portion. The flange may be in contact with a surface of the second portion of the protrusion of the core, including a boundary between the first portion of the protrusion of the core and the second portion of the protrusion of the core.

In a display device according to an example embodiment, the transformer may further include a third inductor sub-assembly including a third bobbin having a third opening corresponding to an outer circumference of the first inductor sub-assembly, and an inductor wound around the third bobbin. The third inductor sub-assembly may be in contact with at least a portion of the outer circumference of the first inductor sub-assembly.

In a display device according to an example embodiment, the transformer may be configured to output, based on the inductor of the first inductor sub-assembly receiving a first current, a second current induced in the inductor of the second inductor sub-assembly based on magnetic flux of the inductor of the first inductor sub-assembly generated by the first current. The transformer may be configured to output, based on the inductor of the first inductor sub-assembly receiving the first current, a third current induced in the inductor of the third inductor sub-assembly based on magnetic flux of the inductor of the first inductor sub-assembly generated by the first current.

In a display device according to an example embodiment, the second current may be generated based on a first leakage inductance between the inductor of the first inductor sub-assembly and the inductor of the second inductor sub-assembly. The third current may be generated based on a second leakage inductance between the inductor of first inductor sub-assembly and the inductor of the third inductor sub-assembly. The first leakage inductance may be larger than the second leakage inductance.

In a display device according to an example embodiment, the transformer may further include a fourth inductor sub-assembly including a fourth bobbin having a fourth opening corresponding to the outer circumference of the first inductor sub-assembly, and an inductor wound around the fourth bobbin. The fourth inductor sub-assembly may be in contact with another portion distinguished from a portion in contact with the third inductor sub-assembly, in the transformer.

In a display device according to an example embodiment, the transformer may be configured to output, based on the inductor of the first inductor sub-assembly receiving a first current, a second current induced in the inductor of the third inductor sub-assembly based on magnetic flux of the inductor of the first inductor sub-assembly generated by the first current, and generated based on first leakage inductance between the first inductor sub-assembly and the third inductor sub-assembly. The transformer may be configured to output, based on the inductor of the first inductor sub-assembly receiving the first current, a third current induced in the inductor of the fourth inductor sub-assembly based on magnetic flux of the inductor of the first inductor sub-assembly generated by the first current, and generated based on second leakage inductance between the first inductor sub-assembly and the fourth inductor sub-assembly.

In a display device according to an example embodiment, the display device may further comprise a display panel including one or more LEDs (Light Emitting Diodes), a first circuit configured to control brightness of the one or more LEDs included in the display panel, and a second circuit distinct from the first circuit. The transformer may be electrically coupled to the first circuit via the inductor of the second sub-assembly. The transformer may be electrically coupled to the second circuit via the inductor of the third inductor sub-assembly and the inductor of the fourth inductor sub-assembly.

In a display device according to an example embodiment, the first circuit may obtain, from a first voltage applied to the inductor of the second inductor sub-assembly, a second voltage greater than the first voltage, at least based on leakage inductance between the inductor of the first inductor sub-assembly and the inductor of the second inductor sub-assembly, being provided through the inductor of the second inductor sub-assembly coupled to the first circuit.

In a display device according to an example embodiment, the display device may further include a power factor corrector comprising circuitry having one end receiving a rectified alternate current signal and another end outputting a power signal generated from the rectified alternate current signal. The display device may further include an inverter having one end coupled to the other end of the power factor corrector and the other end coupled to one end of the inductor of the first inductor sub-assembly of the transformer, the inverter generating a different alternate current signal being provided to the inductor of the first sub-assembly from the power signal output from the power factor corrector, and having a phase independent of the rectified alternate current signal.

In a display device according to an example embodiment, the second bobbin of the second inductor sub-assembly may include a tube portion including an end where the second opening is formed, and another end where a third opening distinct from the second opening is formed.

In a display device according to an example embodiment, a cross-section of the third opening formed in the other portion of the tube portion of the second bobbin may corresponds to a cross-section of outer circumference of the first inductor sub-assembly.

In a display device according to an example embodiment, the tube portion of the second bobbin may comprises a first portion including the end where the second opening is formed and having a length of the second portion of the core, and a second portion including the other end where the third opening is formed.

A display device according to an example embodiment may comprises a transformer including a first core including a first surface and a protrusion protruding from the first surface along a direction which the first surface faces, wherein a cross-section of the protrusion perpendicular to the direction has a first area. The transformer of the display device includes a first inductor sub-assembly including a first bobbin including a first opening corresponding to the first area, in contact with an outer circumference of the protrusion of the first core, and an inductor wound around the first bobbin; a second core including a second surface facing and being spaced apart from a first surface of the first core, and a protrusion protruding from the second surface along a direction which the second surface faces, wherein a cross-section of the protrusion perpendicular to the direction which the second surface faces may have a second area different from the first area. The transformer of the display device includes a second inductor sub-assembly including a second bobbin having a second opening corresponding to the second area, in contact with an outer circumference of the protrusion of the second core, and an inductor wound around the second bobbin.

In a display device according to an example embodiment, the first bobbin of the first inductor sub-assembly may further include a first tube portion having an inner circumference corresponding to the first area of the first opening and having a length greater than a length of the protrusion of the first inductor sub-assembly, the inductor of the first inductor sub-assembly being wound around an outer circumference of the first tube portion. The first bobbin of the first inductor sub-assembly may further include a first flange extending from one end of the first tube portion, along a direction perpendicular to the first tube portion. The second bobbin of the second inductor sub-assembly may further include a second tube portion having an inner circumference corresponding to the second area of the second opening, the inductor of the second inductor sub-assembly being wound around an outer circumference of the second tube portion. The second bobbin of the second inductor sub-assembly may further include a second flange extending from one end of the second tube portion, along a direction perpendicular to the second tube portion.

In a display device according to an example embodiment, the first tube portion and the second tube portion respectively corresponding to the first flange and the second flange being in contact with each other may include an air gap between one end of the protrusion of the first inductor sub-assembly and one end of the protrusion of the second inductor sub-assembly.

In a display device according to an example embodiment, the transformer may further include a third inductor sub-assembly including a third bobbin having a third opening corresponding to an outer circumference of the first inductor sub-assembly, and an inductor wound around the third bobbin. The third inductor sub-assembly may be in contact with at least a portion of the outer circumference of the first inductor sub-assembly.

In a display device according to an example embodiment, the transformer may be configured to output, based on the inductor of the first inductor sub-assembly receiving a first current, a second current induced in the inductor of the second inductor sub-assembly based on magnetic flux of the inductor of the first inductor sub-assembly generated by the first current. The transformer may be configured to output, based on the inductor of the first inductor sub-assembly receiving the first current, a third current induced in the inductor of the third inductor sub-assembly based on magnetic flux of the inductor of the first inductor sub-assembly generated by the first current.

In a display device according to an example embodiment, the second current may be generated based on first leakage inductance between the inductor of the first inductor sub-assembly and the inductor of the second inductor sub-assembly. The third current may be generated based on second leakage inductance between the inductor of the first inductor sub-assembly and the inductor of the third inductor sub-assembly. The first leakage inductance may be larger than the second leakage inductance.

In a display device according to an example embodiment, the transformer may further include a fourth inductor sub-assembly including a fourth bobbin having a fourth opening corresponding to an outer circumference of the first inductor sub-assembly, and an inductor wound around the fourth bobbin. The fourth inductor sub-assembly may be in contact with another portion distinguished from a portion in contact with the third inductor sub-assembly in the outer circumference of the first inductor sub-assembly, in the transformer.

In a display device according to an example embodiment, the display device may further comprise a display panel including one or more LEDs (Light Emitting Diodes), a first circuit configured to control brightness of the one or more LEDs included in the display panel, and a second circuit distinct from the first circuit. The transformer may be electrically coupled to the first circuit via the inductor of the second sub-assembly, and may be electrically coupled to the second circuit via the inductor of the third inductor sub-assembly and the inductor of the fourth inductor sub-assembly.

The devices described herein may be implemented as hardware components, or software components, and/or a combination of the hardware components and the software components. For example, the devices and components described in the embodiments may be implemented using one or more general-purpose or special-purpose of computers, such as e.g., a processor, a controller, an arithmetic logic unit (ALU), a digital signal processor, a microcomputer, a field programmable gate array (FPGA), a programmable logic unit (PLU), a microprocessor, or any other device capable of executing and responding to instructions. A processing unit/device may execute an operating system (OS) and one or more software applications running on the operating system. Further, the processing unit may access, store, manipulate, process, and generate data in response to execution of the software. For convenience of understanding, although it is sometimes described that a single processing unit is used, one of ordinary knowledge in the art will appreciate that the processing unit may include a plurality of processing elements and/or plural types of such processing elements. For example, the processing unit may include multiple processors or a single processor and at least one controller. Other processing configurations may be also possible, such as a parallel processor.

The software may include computer programs, codes, instructions, or a combination of one or more of the same, and configure a processing unit to operate as desired or command the processing unit independently or collectively. The software and/or data may be embodied in any type of machine, component, physical device, computer storage medium or device for interpretation by the processing unit or providing instructions or data to thereto. The software may be distributed over networked computer systems and stored or executed in a distributed manner. Software and data may be stored in one or more computer-readable recording media.

As described above, although the exemplary embodiments have been described with reference to some limited embodiments and drawings, various modifications and changes may be made from the above description by those skilled in the art. For example, although the techniques described above are performed in an order different from the described methods, and/or the described system, structure, apparatus, circuit, etc. are coupled or combined in a different form than the described method, and/or replaced or substituted by other components or equivalents thereof, an appropriate result can be achieved.

Therefore, any other implementations, alternative embodiments, and/or equivalents to those claims will fall within the scope of the following claims.

What is claimed is:

1. A display device, comprising a transformer comprising:
a core including a first surface and a protrusion protruding
  from the first surface along a direction which the first surface faces, wherein a cross-section of a first portion of the protrusion perpendicular to the direction which the first surface faces has a first area and a cross-section of a second portion of the protrusion between the first portion and the first surface has a second area larger than the first area;

a first inductor sub-assembly including a first bobbin having a first opening corresponding to the first area, to be in contact with an outer circumference of a first portion of the core, and an inductor wound around the first bobbin;

a second inductor sub-assembly including a second bobbin having a second opening corresponding to the second area, to be in contact with an outer circumference of a second portion of the core, and an inductor wound around the second bobbin; and a third inductor sub-assembly including a third bobbin having a third opening corresponding to an outer circumference of the first inductor sub-assembly, and an inductor wound around the third bobbin, wherein the third inductor sub-assembly is in contact with at least a portion of the outer circumference of the first inductor sub-assembly.

2. The display device of claim 1, wherein the transformer further includes:

another core including a second surface facing and being spaced apart from the first surface of the core, and a protrusion protruding from the second surface along a direction which the second surface faces, wherein a cross-section of the protrusion of the other core perpendicular to the direction which the second surface faces, has the first area; and wherein the protrusion of the other core is inserted into the first opening of the first inductor sub-assembly, to be in contact with at least a portion of an inner circumference of the first inductor sub-assembly.

3. The display device of claim 2, wherein the first bobbin of the first inductor sub-assembly further includes:

a tube portion wherein the inductor of the first inductor sub-assembly is wound around an outer circumference of the tube portion, and having an inner circumference corresponding to the first area of the first opening;

wherein a space between one end of the protrusion of the core inserted in the inner circumference of the tube portion and one end of the protrusion of the other core forms an air gap.

4. The display device of claim 3, wherein the first bobbin of the first inductor sub-assembly further includes a flange extending from one end of the tube portion along a direction perpendicular to the tube portion, and the flange is in contact with a surface of the second portion of the protrusion of the core, including a boundary between the first portion of the protrusion of the core and the second portion of the protrusion of the core.

5. The display device of claim 1, wherein the transformer is configured to:

output, based on the inductor of the first inductor sub-assembly receiving a first current, a second current induced in the inductor of the second inductor sub-assembly based on magnetic flux of the inductor of the first inductor sub-assembly generated by the first current; and output, based on the inductor of the first inductor sub-assembly receiving the first current, a third current induced in the inductor of the third inductor sub-assembly based on magnetic flux of the inductor of the first inductor sub-assembly generated by the first current.

6. The display device of claim 5, wherein the second current is generated based on a first leakage inductance between the inductor of the first inductor sub-assembly and the inductor of the second inductor sub-assembly, and the third current is generated based on a second leakage inductance between the inductor of first inductor sub-assembly and the inductor of the third inductor sub-assembly, the first leakage inductance being larger than the second leakage inductance.

7. The display device of claim 1, wherein the transformer further includes:

a fourth inductor sub-assembly including a fourth bobbin having a fourth opening corresponding to the outer circumference of the first inductor sub-assembly, and an inductor wound around the fourth bobbin;

wherein the fourth inductor sub-assembly is in contact with another portion distinguished from a portion in contact with the third inductor sub-assembly, in the transformer.

8. The display device of claim 7, wherein the transformer is configured to:

output, based on the inductor of the first inductor sub-assembly receiving a first current, a second current induced in the inductor of the third inductor sub-assembly based on magnetic flux of the inductor of the first inductor sub-assembly generated by the first current, and generated based on first leakage inductance between the first inductor sub-assembly and the third inductor sub-assembly; and output, based on the inductor of the first inductor sub-assembly receiving the first current, a third current induced in the inductor of the fourth inductor sub-assembly based on magnetic flux of the inductor of the first inductor sub-assembly generated by the first current, and generated based on second leakage inductance between the first inductor sub-assembly and the fourth inductor sub-assembly.

9. The display device of claim 7, further comprising:

a display panel including one or more light emitting diodes (LEDs);

a first circuit configured to control brightness of the one or more LEDs included in the display panel; and a second circuit distinct from the first circuit;

wherein the transformer is electrically coupled to the first circuit via the inductor of the second sub-assembly, and is electrically coupled to the second circuit via the inductor of the third inductor sub-assembly and the inductor of the fourth inductor sub-assembly.

10. The display device of claim 9, wherein the first circuit is configured to obtain, from a first voltage applied to the inductor of the second inductor sub-assembly, a second voltage greater than the first voltage, at least based on leakage inductance between the inductor of the first inductor sub-assembly and the inductor of the second inductor sub-assembly, being provided through the inductor of the second inductor sub-assembly coupled to the first circuit.

11. The display device of claim 1, further comprising:

a power factor corrector having one end configured to receive a rectified alternate current signal and the other end configured to output a power signal generated from the rectified alternate current signal; and an inverter having one end coupled to the other end of the power factor corrector and the other end coupled to one end of the inductor of the first inductor sub-assembly of the transformer, wherein the inverter is configured to generate a different alternate current signal being provided to the inductor of the first sub-assembly from the power signal output from the power factor corrector, and has a phase independent of the rectified alternate current signal.

12. The display device of claim 1, wherein the second bobbin of the second inductor sub-assembly includes a tube portion including an end where the second opening is formed, and another end where a third opening distinct from the second opening is formed.

13. The display device of claim 12, wherein a cross-section of the third opening formed in the other portion of the tube portion of the second bobbin corresponds to a cross-section of outer circumference of the first inductor sub-assembly.

14. The display device of claim 12, wherein the tube portion of the second bobbin includes a first portion including the end where the second opening is formed and having a length of the second portion of the core, and a second portion including the other end where the third opening is formed.

15. A display device comprising a transformer, the transformer comprising:

a first core including a first surface and a protrusion protruding from the first surface along a direction which the first surface faces, wherein a cross-section of the protrusion perpendicular to the direction has a first area;

a first inductor sub-assembly including a first bobbin including a first opening corresponding to the first area, to be in contact with an outer circumference of the protrusion of the first core, and an inductor wound around the first bobbin;

a second core including a second surface facing and being spaced apart from a first surface of the first core, and a protrusion protruding from the second surface along a direction which the second surface faces, wherein a cross-section of the protrusion perpendicular to the direction which the second surface faces has a second area different from the first area; and a second inductor sub-assembly including a second bobbin having a second opening corresponding to the second area, to be in contact with an outer circumference of the protrusion of the second core, and an inductor wound around the second bobbin; and a third inductor sub-assembly including a third bobbin having a third opening corresponding to an outer circumference of the first inductor sub-assembly, and an inductor wound around the third bobbin, wherein the third inductor sub-assembly is in contact with at least a portion of the outer circumference of the first inductor sub-assembly.

16. The display device of claim 15, wherein the first bobbin of the first inductor sub-assembly further includes:

a first tube portion having an inner circumference corresponding to the first area of the first opening and having a length greater than a length of the protrusion of the first inductor sub-assembly, the inductor of the first inductor sub-assembly being wound around an outer circumference of the first tube portion, and a first flange extending from one end of the first tube portion, along a direction perpendicular to the first tube portion; and wherein the second bobbin of the second inductor sub-assembly further includes:

a second tube portion having an inner circumference corresponding to the second area of the second opening, the inductor of the second inductor sub-assembly being wound around an outer circumference of the second tube portion, and a second flange extending from one end of the second tube portion, along a direction perpendicular to the second tube portion.

17. The display device of claim 16, wherein the first tube portion and the second tube portion correspond to the first flange and the second flange in contact with each other include an air gap between one end of the protrusion of the first inductor sub-assembly and one end of the protrusion of the second inductor sub-assembly.

18. The display device of claim 15, wherein the transformer is configured to:

output, based on the inductor of the first inductor sub-assembly receiving a first current, a second current induced in the inductor of the second inductor sub-assembly based on magnetic flux of the inductor of the first inductor sub-assembly generated by the first current; and output, based on the inductor of the first inductor sub-assembly receiving the first current, a third current induced in the inductor of the third inductor sub-assembly based on magnetic flux of the inductor of the first inductor sub-assembly generated by the first current.

* * * * *